US006275937B1

United States Patent
Hailpern et al.

(10) Patent No.: US 6,275,937 B1
(45) Date of Patent: Aug. 14, 2001

(54) COLLABORATIVE SERVER PROCESSING OF CONTENT AND META-INFORMATION WITH APPLICATION TO VIRUS CHECKING IN A SERVER NETWORK

(75) Inventors: Brent Tzion Hailpern, Katonah; Peter Kenneth Malkin, Ardsley; Robert Jeffrey Schloss, Briarcliff Manor; Steve R. White, New York; Philip Shi-Lung Yu, Chappaqua; Charles Campbell Palmer, Golden Bridge, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/979,748

(22) Filed: Nov. 26, 1997

Related U.S. Application Data

(60) Provisional application No. 60/064,413, filed on Nov. 6, 1997.

(51) Int. Cl.[7] .................................. G06F 7/00; H04L 9/00

(52) U.S. Cl. .......................... 713/188; 713/167; 713/201; 709/201; 709/205

(58) Field of Search ..................................... 709/201, 205, 709/246, 203, 315; 713/167, 201

(56) References Cited

U.S. PATENT DOCUMENTS

| | | | |
|---|---|---|---|
| 5,319,776 | * | 6/1994 | Hile et al. ............................. 713/200 |
| 5,337,360 | * | 8/1994 | Fischer ................................. 713/167 |
| 5,497,491 | * | 3/1996 | Mitchell et al. ...................... 709/315 |
| 5,623,600 | | 4/1997 | Ji et al. . |
| 5,862,325 | * | 1/1999 | Reed et al. ........................... 709/210 |
| 5,881,151 | * | 3/1999 | Yamamoto ........................... 713/200 |
| 6,023,579 | * | 2/2000 | Hellgren et al. ........................ 717/2 |

OTHER PUBLICATIONS

"MIME (Multipurpose Internet Mail Extensions) Part One: Mechanisms for Specifying and Describing the Format of Internet Message Bodies," Network Working Group N. Borenstein Request for Comments: 1521 Bellcore, Obsoletes: 1341, Category: Standards Track, pp. 1–75 (Sep. 1993).

T. Krauskopf, J. Miller, P. Resnick and W. Tresse, "PICS Label Distribution Label Syntax and Communication Protocols," Version 1.1, REC–PICS,labels–961031, W3C Recommendation, pp. 1–31 (Oct. 31, 1996).

C. Evans, C.D.W. Feather, A. Hopmann, M. Presler–Marshall, and Paul Resnick, "PICSRules 1.1," Last Modified Aug. 28, 1997, pp. 1–23.

GROUP WatchDog Version 1.2, User's Guide, Feb. 16, 1994, Group Wege & Partner EDV–Unternehmensberatung GmbH, Karlsruhe.

* cited by examiner

*Primary Examiner*—Gilberto Barron, Jr.
(74) *Attorney, Agent, or Firm*—Gail Zaric, Esq.; Heslin & Rothenburg, P.C.

(57) ABSTRACT

Method, system and computer program product for collaboratively processing a data object in a client-server hierarchy based on meta-information associated with the object. Processing results are indicated by the server that performed the processing as updates to the meta-information associated with the data object. The PICS protocol may be used to communicate the meta-information. Digital signing and authentication of the object and associated meta-information are also described. Further, servers can determine processing by considering various factors, e.g., their current load condition; if the object is to be multicast; if the object can be cached; and/or if the specified cost and time constraints can be met. The overall processing applied to data objects can be divided between servers based on object types, steps, functions, software packages or versions/releases. Other aspects of the invention are also described.

85 Claims, 10 Drawing Sheets

COLLABORATIVE SERVER PROCESSING OF CONTENT AND META-INFORMATION WITH APPLICATION TO VIRUS CHECKING IN A SERVER NETWORK

CROSS-REFERENCE TO RELATED APPLICATION

This application claims the benefit of U.S. Provisional Application No. 60/064,415, filed Nov. 6, 1997, entitled "Collaborative Server Processing Of Content And Meta-Information With Application To Virus Checking In A Server Network", which is hereby incorporated herein by reference in its entirety. The present invention is also related to commonly assigned co-pending U.S. patent application Ser. No. 08/898,220, filed Jul. 22, 1997, entitled "Dynamic Modification of Multimedia Content," by P. Malkin et al., which is hereby incorporated herein by reference in its entirety.

TECHNICAL FIELD

This invention relates in general to an improved data processing system. As a particular aspect, the present invention relates to a collaborative method of server processing of data objects in a server network. In a more particular aspect, the present invention relates to a collaborative method of virus checking data objects in a network of servers based on meta-information associated with each object.

GLOSSARY OF TERMS

While dictionary meanings are also implied by certain terms used herein, the following glossary of terms may be useful.

Client

A client is a computer system which issues, e.g., commands to a server which performs the task associated with the command.

Hypertext Markup Language (HTML)

HTML is the language used by Web servers to create and connect documents that are viewed by Web clients. HTML uses Hypertext documents.

Hypertext Transfer Protocol (HTTP)

HTTP is an example of a stateless protocol, which means that every request from a client to a server is treated independently. The server has no record of previous connections. At the beginning of a Universal Resource Locator (URL), "http:" indicates the requesting client and target server should communicate using the HTTP protocol regarding the specified resource. For the latest specification, see RFC 2068, R. Fielding et al., "Hypertext Transfer Protocol—HTTP/1.1," filed January 1997; obtainable via URL: http://www.cis.ohio-state.edu/htbin/rfc/rfc2068.html, or refer to D. E. Comer, *Internetworking with TCP/IP: Principles, Protocols, and Architecture*, Prentice Hall, Englewood Cliffs, N.J., 1988, for details on retrieving Request For Comments (RFCs) using electronic mail and File Transfer Protocol (FTP).

HTTP Daemon (HTTPD)

A web server having Hypertext Transfer Protocol and Common Gateway Interface capability. The HTTPD is typically supported by an access agent which provides the hardware connections to machines on the intranet and access to the Internet.

Internet

The network of networks and gateways that use the Transmission Control Protocol/Internet Protocol (TCP/IP) suite of protocols.

Internet Browser or Web Browser

A graphical interface tool that runs Internet protocols such as HTTP, and displays results on a customer's screen. The browser can act as an Internet tour guide, complete with pictorial desktops, directories and search tools used when a user "surfs" the Internet. In this application, the Web browser is a client service which communicates with the World Wide Web.

Meta-Information and Meta Data

Any information or data associated with a given object. For example, in HTTP, information can be associated with both HTTP requests and responses by its inclusion as a field in the transaction's HTTP header, e.g., the length of a returned data object can be specified in the HTTP response header's "Length:" field.

MIME (Multimedia Internet Message Extension)

A technique for sending arbitrary data through electronic mail on the Internet. For details, see N. Borenstrein, et al., "MIME (Multimedia Internet Message Extension) Part One: Mechanisms for Specifying and Describing the Format of Internet Message Bodies," RFC 1521, Sep. 23, 1993.

Multicasting

Broadcasting of multimedia streams (e.g., pushing video data out over the Internet).

PICS (Platform for Internet Content Selection)

PICS ("Platform for Internet Content Selection") specifies a method of sending meta-information concerning electronic content. PICS is a Web Consortium Protocol Recommendation (see J. Miller, ed. et al., "PICS Label Distribution Label Syntax and Communication Protocols," retrievable via URL: http://www.w3.org/pub/WWW/TR/REC-PICS-labels.html for details).

Server

Any computer that performs a task at the command of another computer is a server. A Web server typically supports one or more clients.

Universal Resource Locator (URL)

A way to uniquely identify or address information on the Internet. A URL can be considered a Web document version of an e-mail address. URLs can be cumbersome if they belong to documents buried deep within other. They can be accessed with a Hyperlink. An example of a URL is "http://www.philipyu.com:80/table.html". A URL has four components. Starting from the left, the first specifies the protocol, which is separated from the rest of the locator by a ":". Next is the hostname or Internet Protocol (IP) address of the target host; this is delimited by a "//" on the left and on the right by a "/" or optionally a ":". The port number is optional, and is delimited on the left from the host name by a ":" and on the right by a "/". The fourth component is the actual file name or program name. In this example, the ".html" extension means that this is an HTML file.

World Wide Web (WWW or Web)

The Internet's application that lets people seeking information on the Internet switch from server to server and database to database by clicking on highlighted words or phrases of interest (hyperlinks). An Internet WWW server supports clients and provides information. The Web can be considered as the Internet with all of the resources addressed as URLs and which uses HTML to display the information corresponding to URLs and provide a point-and-click interface to other URLs.

BACKGROUND OF THE INVENTION

The rapid increase in the popularity of the Internet has led to a corresponding increase in the need for processing network traffic. This processing includes both that which is mandatory (e.g., encrypted data that must be decrypted before it can be used), and that which is recommended (e.g., executable code retrieved from public Internet archives that should be checked for viruses before it is used).

Typically, when a user wants to process data retrieved from the Internet, they do so by installing and running a program that performs the desired processing on their client machine. Employees of a company, for example, might be asked or required to install and run a particular virus checking program (e.g., the AntiVirus™ product sold by International Business Machines Corporation (IBM)) on all data that they obtain from the Internet, in order to protect the company's intranet from infestation. Having individual users perform required processing like this is not a practical solution for several reasons:

- Non-technical users may not be able to use the required software due to a lack of technical knowhow.
- Other users may not use the software simply because it is too much bother.
- If a given type of processing has any idiosyncrasies (e.g., executables whose filenames end in "exebin" sometimes, rather than simply "exe"), all users will have to be trained to handle them.
- Adding and changing the required processing can be difficult for users.
- An organization has no way to check that all users are performing the required processing, and thus it is difficult to implement an enforceable processing policy.
- Also, if three users pull in the same piece of data, then each user will have to check the data, each performing exactly the same processing on exactly the same piece of data.

In an attempt to centralize the processing of data retrieved from the Internet, intranets that connect to the Internet through a firewall can have the processing performed by the firewall itself (e.g., see the Norton AntiVirus for Firewalls product sold by Symantec Corporation, which runs on PC/s running the WinNT 3.51 Operating System sold by Microsoft). However, this solution creates other problems:

- To perform the additional processing, the firewall must run an additionally complex network-traffic filtering program, thereby increasing the chances that hackers will be able to find a way through the firewall.
  - Compare theorem 3: Exposed machines should run as few programs as possible, the ones that are run should be as small as possible, of William R. Cheswick and Steven M. Bellovin, *Firewalls and Internet Security: Repelling the Wily Hacker*, Addison-Wesley Professional Computing Series, Reading, Mass., 1994. Cited on: p. 7.
- Since most firewalls are not meant to process assembled data streams, the speed of communication through the firewall will be decreased because, in addition to processing data objects from the outside Internet, the firewall will also have to assemble the data objects from the IP packet streams running through it.
- It is impossible to provide different processing for subgroups within the organization (e.g., additional virus checking to the financial department), without either degrading the firewall's security and performance further, or requiring the individual user of the relevant subgroups to perform the processing by themselves.

Based upon the above, there exists a need for a collaborative method for processing of data objects. The present invention is directed to this need.

SUMMARY OF THE INVENTION

Another alternative is to have the required processing performed by intermediate servers: HTTP, FTP and Gopher proxies (e.g., the Internet Connection Server™ (ICS) sold by IBM), Network News Transfer Protocol (NNTP) Servers (e.g., InterNetNews (INN), version 1.5.1, a publicly available Usenet News transport server), and mail relays, (e.g., the send mail process included with the AIX 4.1.5 product sold by IBM)) within the intranet; all of which run on the IBM product sold under the trademark RS/6000 workstation. With this solution, the relevant server or servers are modified so that they can perform the required processing on any data which flows through them. Each server is then configured to perform the processing required for the subnet which it supports. For example, in the above-incorporated application by P. Malkin et al., entitled "Dynamic Modification of Multimedia Content," U.S. Ser. No. 08/898,220, a method is proposed enabling proxy servers to modify media streams that pass through them. The drawback with this commonly-owned solution, however, is that the internal servers have no way to collaborate with each other:

- In deciding whether or not to process a given data object, a low level server has no way to know whether a higher level server has already performed the given processing.
- A nearly saturated higher level server has no way of passing an unprocessed object to a lower level server, indicating to the lower level server that the given object still needs to be processed.

Thus, this invention provides a method by which network servers can process the data objects they handle collaboratively. Further, in accordance with the principles of this invention, a method is presented which allows clients to specify desired processing to network servers so that the clients' needs can be fulfilled without having to customize or configure the network servers. A method is also presented herein by which network servers can communicate back to the clients the processing performed on a given piece of data. For example, a virus checker might tell a requesting client that a virus was found in the data requested and that there was no way to fix or eliminate the problem. In addition, this invention presents a mechanism for both the requesters and providers of processing to confirm their requests and actions respectively, to enable the providers to charge for their services, since providers must be able to confirm the requests they receive, and requesters must be able to confirm the processing done for them.

More particularly, and in accordance with the aforementioned, the present invention is directed to a method and system of collaboratively processing a data object in a client-server hierarchy based on meta-information associated with the object. This method includes:

1. Processing the object content based on meta-information associated with the object;
2. Updating/adding the meta-information to reflect the processing accomplished; and
3. Communicating the object content and meta-information to a next server in the path for further processing.

Another aspect of this invention is that the processing of Step 1 above can further comprise modifying the object content. The overall processing performed on the data object depends upon the initial meta data associated with the data object, and this initial meta data can be user specified.

The present invention also provides a method of using the PICS protocol to communicate the meta-information. This includes the initial specification and the modified meta-information reflecting the processing done.

A further aspect of the current invention is that the data object processed can be an executable code. The data object can also be a compound object which only has processing applied to some of its component objects by a given server node, and different subsets if these component objects may be checked at different servers.

According to another aspect of the present invention, a method is given to provide feedback on prior processing results to other processing nodes, and the PICS protocol can be used to accomplish this communication.

A method in accordance with the principles of this invention may also include a server determining the processing to be performed by considering:

a data object's type;

current load condition of the server;

a number of times the data object has been requested;

whether the object is for multicasting;

if the object is to be cached;

whether the requested processing can be provided for a specified price; and whether the requested processing can be accomplished within a specified time window.

The current invention also provides a cooperative method to check virus patterns of an object in a network of servers which includes:

1. Processing object content across multiple servers on the communication path to the destination node; and 2. Using meta-information associated with the object to convey the processing accomplished by prior servers in the communication path.

This processing can be divided based on object types, steps, functions, coverage, software packages or versions/releases.

A method is also provided for a user to specify the desired type of security (e.g, encryption/decryption) or antivirus checking for requested objects or outgoing objects.

The current invention also provides a cooperative virus checking method which includes:

1. A higher level server passing down the meta-information on the virus checking already performed on the object; and 2. A lower level server either performing further virus checking and then updating the meta-information on the virus checking; or simply passing the object through without further checking.

The checking operation performed by each server can be decided dynamically by considering:

The load condition of the server;

the user specification;

the data object's types;

the number of times the object has been requested;

whether the object is for multicasting; and whether the object is to be cached.

An aspect of the present invention is that the network of servers includes a network of heterogeneous servers wherein the object processing and meta-information updating are not performed by all servers in the hierarchy. As described in the detailed description, the servers which make up the server hierarchy can be HTTP, FTP or Gopher proxy servers, mail (relay) servers, or NNTP (news) servers.

Still another aspect of the present invention encompasses a method including the steps of:

1. Maintaining statistics and/or classification of the reliability (of virus detection) of content sources;

2. Applying virus checking based on the reliability classification of the source; and 3. Passing source classification with the object.

The current invention also provides methods for each server to report the following information back to the users:

The checking performed by the server; and

The reliability of the content source.

Further, this reporting can be accomplished using the PICS protocol to communicate information through the hierarchy. Another aspect of the present invention is that it provides a method to communicate the type of checking desired up the server hierarchy using a PICS label with a PICS category/value pair to represent the information. Reliability of a content source can also be communicated down the server hierarchy using a PICS label with a PICS category/value pair to represent the information.

The present invention also provides a method wherein the servers of the network can cache any given processed object, and return the cached copy in response to future requests for it, i.e., whenever the actual given object has not changed.

In still another aspect, the present invention encompasses a method wherein an intranet can be customized so that all clients and proxies are forced to use their designated higher level proxy server.

Those skilled in the art will note that additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

Figure 1:
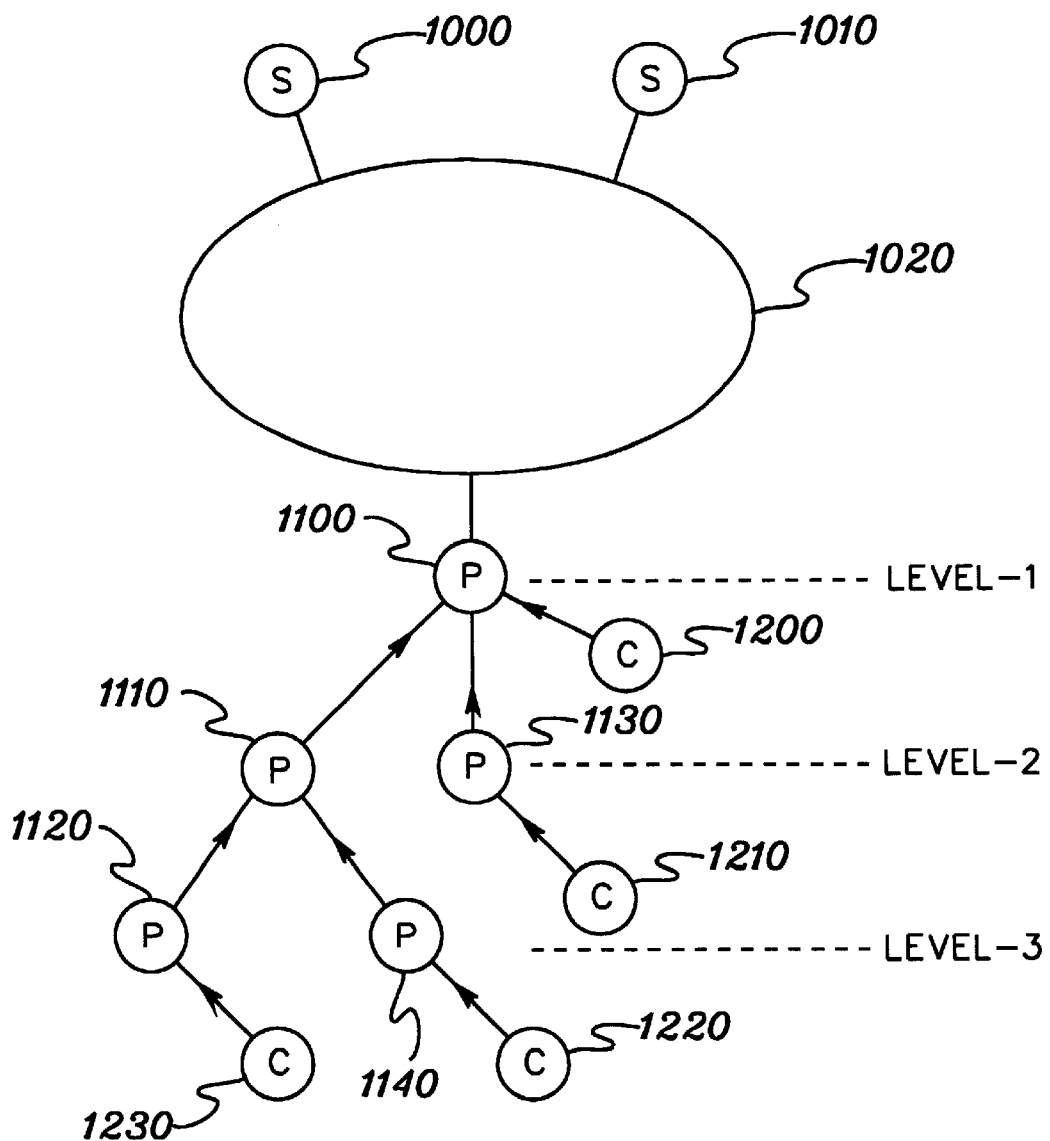
FIG. 1 depicts one example of a diagram of a proxy hierarchy to implement features in accordance with the principles of the present invention.

FIG. 1 depicts an example of the overall functional architecture of a hierarchy of proxy servers having features of the present invention (refer to the above-referenced RFC 2068 for details). In this diagram, an arrow from a first node, node A (i.e., any proxy or client), to a second node, node B, indicates that node A uses B as a proxy. By way of example only, the proxy hierarchy depicted includes three levels of proxy servers. One skilled in the art will appreciate that there can be any number of levels in the proxy hierarchy and that the clients (1200, 1210, 1220 and 1230) can, in fact, be connected to any level thereof.

The highest level (level-1) proxy (1100) connects directly to the Internet (1020), and, in the preferred implementation, it is through this proxy (1100) that all other proxies (1110, 1120, 1130, 1140) and clients (1200, 1210, 1220, 1230) in the hierarchy access information from content servers (1000, 1010) connected to the Internet (1020). Although, as those skilled in the art will realize, in a general LAN, it is possible for any client to request information directly from any server connected to the Internet, a method is described below with reference to FIG. 2, which enables firewall isolated intranets to be customized so that all clients and proxies are forced to use their designated proxies. Returning to FIG. 1, proxy 1100 is the designated proxy for two level-2 proxies (1110 and 1130) with one of the level-2 proxies (1110) being the designated proxy for two level-3 proxies (1120 and 1140). As depicted, proxy servers 1100, 1130, 1140, and 1120 are the designated proxy servers for clients 1200, 1210, 1220 and 1230, respectively.

From the viewpoint of client 1210, certain proxies (1110, 1120 and 1140) are not part of its proxy hierarchy. Those skilled in the art will appreciate that although a typical communication path is via the immediately higher level proxy, a lower level proxy may communicate directly to other higher level proxies or the Internet.

Examples of a client include, but are not limited to, a PC, a workstation, a set top box, etc. An example of the proxy server is the Internet Connection Server™ (ICS) sold by IBM. Examples of the network include, but are not limited to, the Internet, the World Wide Web, an Intranet and local area networks (LANs). Examples of a content server can include, but are not limited to, Domino Go Web server, or Lotus Domino server, both marketed by IBM. The proxy server or content server can run on any computing node, which includes, but is not limited to, products such as are sold by IBM under the trademarks S/390 SYSPLEX, SP2, or RS/6000 workstations. Typical service requests include World-Wide-Web page accesses, remote file transfers, and electronic mail. In the preferred embodiment, the syntax and semantics of the conversations between web servers and clients is defined by the Hypertext Transfer Protocol (for details, see RFC 2068).

Note that FIG. 1 only conveys a logical connection diagram to represent the information flow of objects and requests. It does not represent a physical connection diagram. The logical connection can change due to workload, and physical events such as a node or link failure. Different types of objects may also follow different logical paths of transmission to reach the users.

Figure 2:
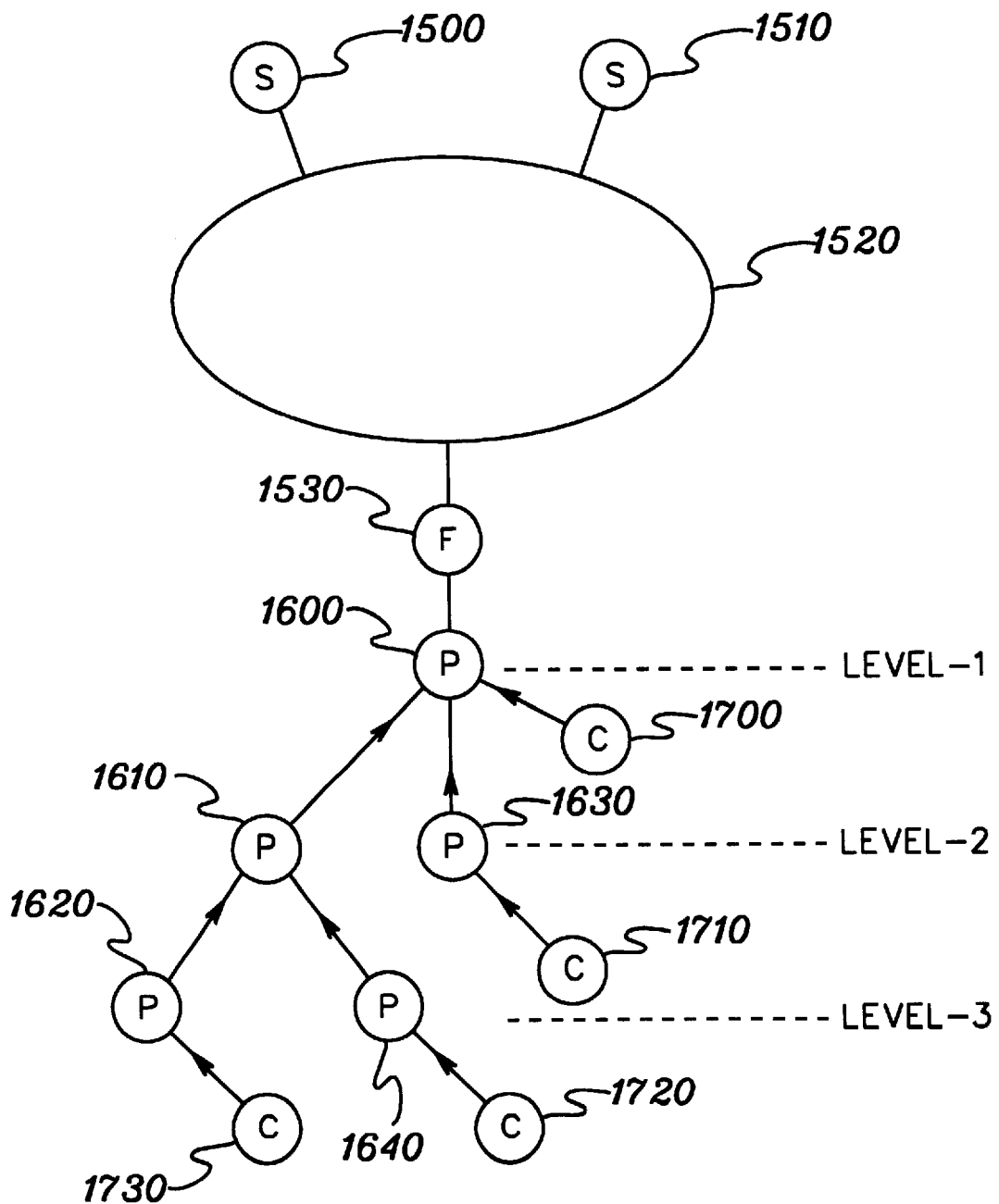
FIG. 2 depicts one example of a diagram of a secure proxy hierarchy to implement features in accordance with the principles of the present invention.

FIG. 2 is virtually equivalent to FIG. 1, except that a firewall (1530) sits between the Internet (1520) and the level-1 proxy (1600). This example presumes that firewall 1530 is the only path to the Internet (1520) for any of the proxies (1600, 1610, 1620, 1630, 1640) and clients (1700, 1710, 1720, 1730) depicted. An example of such a server (1530) includes, but is not limited to, the product "IBM Firewall version 3.1" sold by IBM, which runs on products such as those sold by IBM under the trademark "RS/6000" workstation.

As depicted, the highest level (level-1) proxy (1600) connects directly to the firewall (1530) which, in turn connects to the Internet (1520), and, in the preferred implementation, it is through this proxy (1600) that all other proxies and clients in the hierarchy (1610, 1620, 1630, 1640 and 1700, 1710, 1720, 1730) access information from content servers (1500, 1510) connected to the Internet (1520) elsewhere. Proxy 1600 is the designated proxy for two level-2 proxies (1610, 1630) with one of the level-2 proxies (1610) is designated proxy for two level-3 proxies (1620, 1640). As depicted, proxy servers 1600, 1630 1640 and 1620 are the designated proxy servers for clients 1700, 1710, 1720 and 1730, respectively. To ensure that only proxy server 1600 (and not any other proxy server or client) can access the Internet, firewall 1530 is configured to only allow connections to external servers (1500, 1510) from proxy 1600; connection attempts from any other source will be denied. Proxy 1600 limits requests that it will accept to those originating from proxies 1610, 1630 and from client 1700. Proxy 1630 limits accepted requests to those originating from client 1710. Proxy 1610 limits requests it will accept to those originating from proxies 1620 and 1640. Proxies 1620, 1640 and 1630 limit the requests they will accept to those originating from clients 1730, 1720 and 1710, respectively.

The acceptance limitation specified above can be achieved by extending the behavior of the proxies using an Application Programming Interface (API), like that called Internet Connection Application Programming Interface (ICAPI), which comes with the Internet Connection Server (ICS) product sold by IBM. With the network configured in this way, clients (1700, 1710, 1720, 1730) and proxies (1600, 1610, 1620, 1630, 1640) are forced to use their designated path out to the Internet in order to be successful. Thus, higher level proxies (e.g., corporate level proxies) are assured that requests made by clients from downstream proxies (e.g., division and department level proxies) will eventually pass through them.

Figure 3:
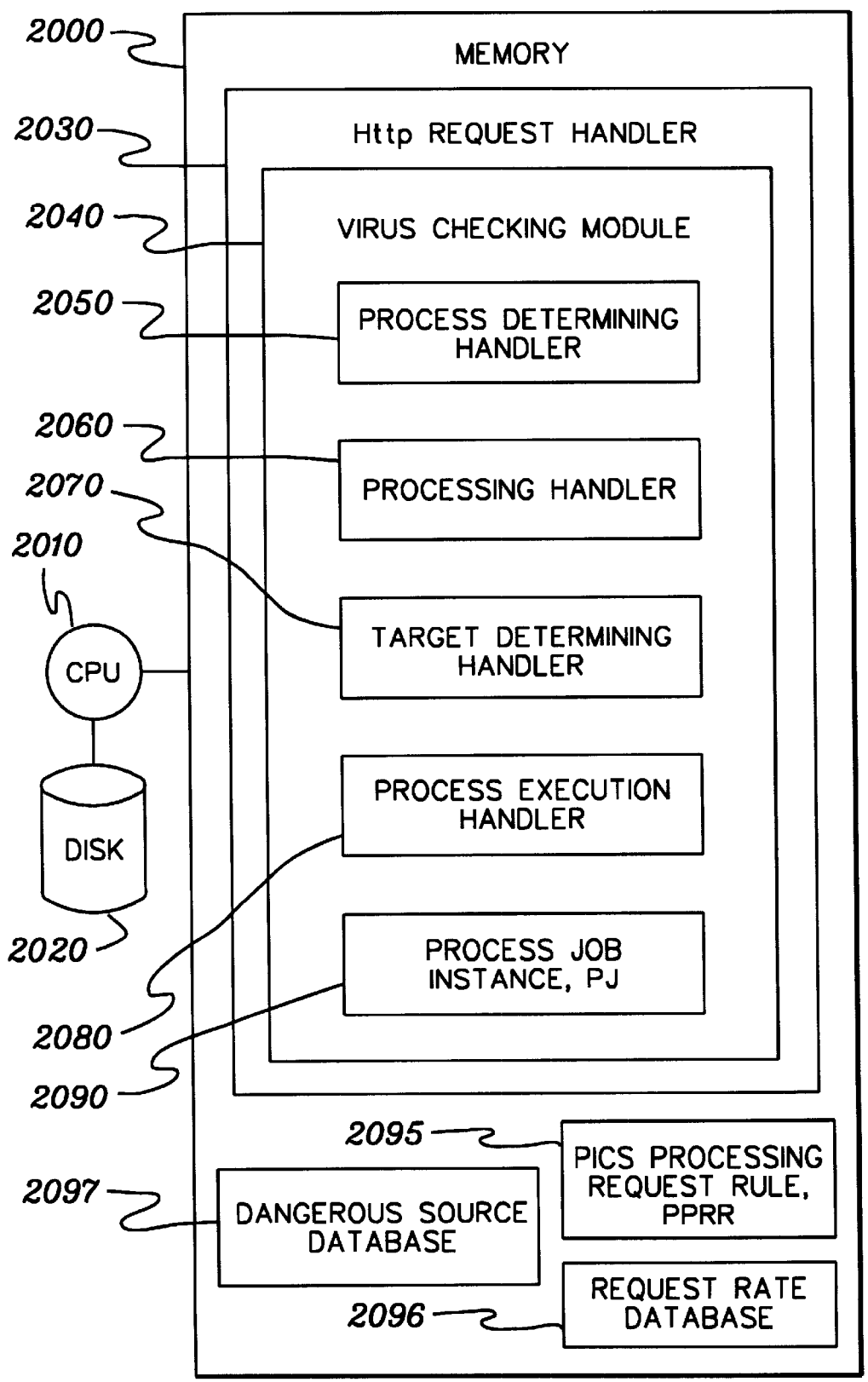
FIG. 3 depicts one example of a server of FIG. 1, in accordance with the principles of the present invention.

FIG. 3 depicts a more detailed example of the architecture of the server of FIG. 1. This server includes a CPU (2010), a disk (2020) such as a magnetic, electronic or optical storage media for persistent data and/or program/code storage, and a memory (2000) for dynamic access and/or execution of the data and/or programs by the CPU (2010). Those skilled in the art will appreciate that within the spirit and scope of the present invention, one or more of the components instantiated in the memory (2000) could be accessed and maintained directly via disk (2020), the network (1020), another server, or could be distributed across a plurality of servers. In accordance with the present invention, this server preferably contains multiple components embodied as software executables on the CPU (2010). These are the:

HTTP Request Handler (2030);
Virus Checking Module (2040);
Process Determining Handler (2050);
Processing Handler (2060);
Target Determining Handler (2070);

Process Execution Handler (2080);

Process Job Instance, PJ (2090);

PICS Processing Request Rule (PPRR) Instance (2095);

Request Rate Database (2096); and

Dangerous Source Database (2097).

Examples of the HTTP Request Handler (2030), Virus Checking Module (2040), Process Determining Handler (2050), Processing Handler (2060), Target Determining Handler (2070) and Process Execution Handler (2080) will be discussed in detail below with reference to FIGS. 5–9.

The Request Rate Database (2096) provides for storage, update and retrieval of the historical information of the number of times the server has received requests for a particular process to be applied to a particular piece of data (e.g., that IBM AntiVirus be applied to foo.exe, where foo.exe is a popular new computer game). This information is kept so that when deciding whether or not to delegate the processing of a given piece of data to a downstream server, a server having features of the current invention can take into account the likelihood that other users will make the same request.

If a server finds that many clients have made the same request, then pursuant to this invention the server should do the processing itself and cache the results (if allowed), so that future requests can be fulfilled more quickly and easily. Specifically, this database cross-references URLs and processing requests (i.e., a requested process) with a number, the number representing how many times the given processing request has been made for the given URL. For example, the server could ask the Request Rate Database (2096): "How many clients have requested IBM AntiVirus be applied to "http://CoolBins.com/foo.exe"?", in response to which the database might specify 10, indicating that the specified request had been received 10 times. Those skilled in the art will appreciate that the Request Rate Database (2096) could maintain and provide access to additional request-rate-related information, enabling, for example, requests like: "How many clients have requested IBM AntiVirus be applied to "http://CoolBins.com/foo.exe" this week?"

Pursuant to another aspect of this invention, the Dangerous Source Database (2070) provides for storage, update and retrieval of historical information regarding which content sources have delivered virus-infected data. Specifically, this database cross-references hostnames with the percentage of objects returned from the given source that were infected. So, for example, if the Process Execution Handler (2080) determines that a given data object is infected, it would call the Dangerous Source Database (2070) to update the entry for this host.

The present invention also has features for efficiently communicating information up and down the hierarchy:

UP: Proxies having features of the current invention can specify the processing they wish to have performed and communicate these requirements up through the hierarchy; and DOWN: Proxies having features of the current invention can indicate the processing they have performed down to clients and lower level proxies.

In a preferred HTTP implementation of the current invention, meta-information is communicated UP the hierarchy using PICS Processing Request Rules (PPRRs) (2095),described below, and DOWN the hierarchy using PICA Processing Labels (PPLs), also described below. As will be described, a host communicates a PPRR (2095) up the hierarchy by including the PPRR (2095) in a "PICS-Rule" field in the HTTP request header of its request. Similarly, a host communicates a PPL down the hierarchy by including the PPL in a "PICS-Label" field in the HTTP response header of the response. Those skilled in the art will appreciate that since both PPRRs and PPLs are included as acceptable fields of the HTTP request and response headers, respectively, that the network of servers wherein the current invention applies can include a network of heterogeneous servers, only some of which may perform the processing and meta-tagging enabled by the current invention.

In a preferred embodiment, the PICSRules language is used by both clients and proxy servers to make a processing request up the proxy hierarchy. (See M. Presler-Marshal ed., "PICSRules 1.1," last modified Aug. 25, 1997, retrievable via URL http://www.w3.org/POCS/picsrules/spec11.htm for a working draft of the W3C PICS Profile Language Group's Language Specification). Specifically, processing requests are made using what we will call PICS Processing Request Rules (PPRRs) (2095), which are simply a particular form of PICSRule-1.1 instance. In overview, a PPRR (2095) specifies:

The requester (e.g., the IP address of their machine);

The load level of the requester's host (e.g., 100%, fully saturated);

What processes the requester is able to execute (e.g., IBM AntiVirus, version 1.4); and The processes to apply to different data types, including what to do given the success or failure of the application (e.g., Block all *.exe files that fail verification by IBM's AntiVirus, version 1.4 or later).

PICS is a World Wide Web Consortium ("W3C") recommendation. Those skilled in the art will appreciate that many other conventional means for storing and communicating a processing request can be used within the spirit and scope of the present invention.

Depicted below is an example of a PPRR (2095):

| | | |
|---|---|---|
| 1. | (PicsRule-1.1 | |
| 2. | ( | |
| 3. | Source ( | |
| 4. | author "9.2.1.1 | |
| 5. | PICS-Processing-Request -Rule | |
| 6. | LoadLevel 50% | |
| 7. | CanExecute 'IBM AntiVirus', 'version 1.4' | |
| 8. | CanExecute 'Microsoft Anti-Virus', 'version 10.01'") | |
| 9. | ServiceInfo ( | |
| 10. | shortname "Service" | |
| 11. | ratfile "http://www.SmallOrg.org/processing.html" ) | |
| 12. | Policy ( | |
| 13. | AcceptIf "((Service.processor = 15) and (Service.version > = 1.4) and | |
| 14. | (Service.type = 1) and (Service.result = 1))" | |
| 15. | RejectIf "((Service.processor = 5) and (Service.version > = 4.2) and | |
| 16. | (Service.type = 5) and (Service.result = 0))" ) | |
| 17. | Policy ( (Accept "otherwise") ) | |
| 18. | ) | |
| 19. | ) | | where as defined by http://www.SmallOrg.org/processing.html (i.e., "Service")

processor=15 means "IBM AntiVirus;"

processor=5 means "Microsoft Anti-Virus;"
type=1 means "check *.exe files;"
type=5 means "check *.txt files;"
result=1 means passed; and
result=0 means failed.

Note that the numbers on the left are only line number indicators and not part of the actual PPRR. Also note that the example fully complies with the PICSRules1.1 specification. Line 1 indicates that this is a PICSRule along with the PICSRule version number, "1.1." Line 3 begins a Source section, which describe the source of the PICSRule rule. Lines 4–8 are an author specification, which, in a preferred implementation, in addition to specifying the IP address of the requester's host, 9.2.1.1 (line 4), also indicates three other types of information.

The first is that the current PICSRule rule is a "PICS-Processing-Request-Rule" (line 5). The second is the LoadLevel or saturation level of the requester's host, i.e., 50% (line 6). In the preferred implementation, this is expressed as a percentage, 0% indicating no load, 100% indicating complete saturation. The other tag appearing within the author section is CanExecute, which indicates what types of processing the requester can perform. Although most clients are able to provide processing, only PPRRs from proxy servers can include this information, since initiating client side processing is not the focus of the present invention. Line 7 indicates that the requester can execute the IBM AntiVirus process, version 1.4, and line 8 indicates that the requester can execute the Microsoft Anti-Virus process, version 10.4. Those skilled in the art will appreciate that, rather than include these three additional types of data in the author value string, one could define new attributes by extending the conventional PICS Rules language using either the reqextension or optextension specifications. Lines 9–11, a ServiceInfo section, define a PICS rating system description (indicated by its URL, http://www.SmallOrg.org/processing.html) with a short name Service. Suppose, for this example, this rating system defines four categories:

processor indicating a virus checking program:
    value=15 indicating "IBM AntiVirus;"
    value=5 indicating "Microsoft Anti-Virus;"
version indicating the version of the program:
    value=virus checker's version number
type indicating the data types to check:
    value=1 indicating "check *.exe files;"
    value=5 indicating "check *.txt files;"
result indicating the result of applying the program:
    value=1 indicating passed
    value=0 indicating failed. Lines 12–16 and 17, the policy sections, specify the conditions under which the transmission of (i.e., access to) a given URL is permitted. Lines 13–14 specify that access is granted if all contained *.exe files are verified by IBM AntiVirus, version 1.4; lines 15–16 specify access is forbidden if Microsoft's Anti-Virus, version 4.2 finds a problem with (i.e., fails when applied to) any contained *.txt files. Line 17 says to permit the transmission of any URL meeting all of preceding policies.

A PPRR (2095) such as this can be stored in permanent storage such as Disk (2020). The syntax for including a PPRR in an HTTP request header is as follows:

PICS-Rule: PPRR where PPRR is of the form shown above. Those skilled in the art will appreciate that, as specified in the PICSRules-1.1. language definition, a given PPRR (2095) may contain any number of policies, each containing at least a single attribute from the set of {RejectIf, AcceptIf, RejectUnless, AcceptUnless, RejectByURL, and AcceptByURL}, with the first two being relevant to the present invention. Each policy may also contain an Explanation attribute. Those with usual skill in the art will understand that RejectUnless and AcceptUnless attributes involving processing cannot be specified, since the order of the processing provided by the current invention is arbitrary.

Those skilled in the art will also appreciate that while any common text editor (e.g., the Notepad™ product sold by Microsoft) can be used to create a PPRR (2095), there are other ways (e.g., a specialized Graphical User Interface (GUI)) of creating a PPRR (2095) within the spirit and scope of the present invention. Those skilled in the art will further appreciate that a user wanting to specify their own PPRR (2095) can point their web browser at a instance of the proxy server having features of the current invention running on their own machine (i.e., a client side proxy), which uses a PPRR (2097) written by the given user. Further, those skilled in the art will appreciate that a PPRR stored in local memory (2000) or disk (2020) could be read in and added to HTTP request headers by a customized (e.g., via an API provided by the browser) or extended web browser.

The current invention also provides a way for servers to communicate the results of their processing down the proxy hierarchy using PICS. PICS was first used for sending values-based rating labels, such as "How many nudity is associated with this content," but the format and meaning of the meta-information is fully general. In PICS, meta-information about electronic content is grouped according to the "rating service"or producer-and-intended-usage of the information and within one such group, any number of categories or dimensions of information may be transmitted. Each category has a range of permitted values, and for a specific piece of content, a particular category may have a single value or multiple values. In addition, the meta-information group (known as a "PICS label") may contain expiration information. There are also facilities for permitting a PICS label to apply to more than one piece of electronic content. Each PICS label for a specific piece of electronic content may be added or removed from the content independently. Although there is currently only PICS support for HTTP, FTP, Gopher, and Extended Simple Mail Transfer Protocol (ESMTP) (a common extended version of Single Mail Transfer Protocol(SMTP)), the technical bodies which define other common application protocols, such as NNTP, are now also considering adding PICS support. A PICS Processing Label (PPL) is a conventional PICS Label which allows servers having features of the current invention to indicate the processing they have applied to a piece of data they return or transfer by including the label in the HTTP header as an additional field:

PICS-Label: PPL where: PPL is a PPL like that shown below.
    In overview, a PPL specifies:
    The machine that performed the processing (e.g., its IP address);
    A comment indicating that the current PICS label is a PPL;
    A comment specifying the ID of who requested the processing;
    A URL or other reference to information that was processed (e.g., "http://acme.com/pub/cool.exe");

A URL of a ratings systems (i.e., A URL which, when returned, provides the semantics for a set of PICS label categories and category values);

A ratings list, i.e., a list of categories label and values which indicate what processing was done, what the results, were, and an indication of the reliability of the data source. Depicted below is an example of one such label:

1. (PICS-1.1
2. by "9.11.156.34"
3. comment "PICS Processing Label"
4. comment "Requester: 9.2.1.1"
5. label for "http://foo.bar.com/appl.exe"
6. "http://www.SmallOrg.org/processing.html"
7. ratings (processor 15 version 1.4 type 1 result 1 reliability 50)
8. )

Note that the numbers on the left are simply number indicators, and not part of the actual PPL. Line 1 indicates that PICS version 1.1 is being used. Line 2 indicates the author of the PPL, in this case "9.11.156.34," i.e., the IP address of the machine that performed the processing described by the PPL. Line 3 is a comment field which identifies the current PICS label as a PPL. Line 4 is another comment line which specifies the identity of who requested the processing. Line 5 is the URL of data that was processed. Line 6 specifies the ratings system that is used to express the processing results; and line 7 is a listing of the results:

"processor 15"—indicating data was processed using "IBM AntiVirus;"

"version 1.4"—indicating version 1.4 of IBM AntiVirus;

"type 1"—indicating data file type of "*.exe;"

"result 1"—indicating success;

"reliability 50"—indicating that 50% of the data from the data's source has been bad (e.g., virus-infected).

Those skilled in the art will appreciate that the value of the label for attribute (line 5) could specify a subsection of a particular URL, e.g., "http://foo.bar.com/appl.exe bits: 42–666" indicating that the processing was only applied to a section of the data content returned from the specified URL. Further, alternative subsection specifications (e.g., "MIME subsection #1") also fall within the scope of the current invention.

Depicted below is an example of a Process Job data structure, an instance of which, PJ (2090) is maintained by servers having features of the current invention. This data structure is used to maintain the information a server needs to carry out the processing for a given request. As shown, the fields of this structure include:

Data—The digital data being requested or submitted for transmission;

Header—The HTTP response header returned to the requester;

Processes—The processes the current server can execute (e.g., IBM AntiVirus, version 1.3);

Targets—A list of the data objects within the Data field, members including both a data component, a data type specifier, the source of the data, and the object's location within Data.

Requirements—A list of the processing the current server can do to support the requested PPRRS. (E.g., I can run "IBM AntiVirus", version "1.3", to check "*.exe" data objects);

Tasks—A list of pairs, each of which specifies a particular member of Processes that the current server should run on the data component of a particular member of Targets. E.g., Run IBM AntiVirus, version 1.3, on the data component of third member of Targets.

Helpers—List of the capabilities and load on the downstream servers. (E.g., host "9.2.3.1" is 50% saturated and can execute "Microsoft Anti-Virus" version "4.2");

Rules—A list of the current request's PPRRs.

Given an instance of the Process Job structure, PJ, the value of the given field, <field name> is accessed using:

PJ. <field name>

For example, the Data field of PJ is accessed using PJ.Data. The contents of the Processes field can be read in from a file written using any conventional text editor (e.g., vi provided with the AIX 4.1.5 product sold by IBM) and read in from either memory (2000) or disk (2020). Those skilled in the art will appreciate that additional fields can be added to this structure to maintain addition information. E.g., a Cached field could be added to record whether or not a request's HTTP request header specified that the results could be cached. Also, a Multicast field could be added to indicate whether the request's data was multicast.

Figure 4:
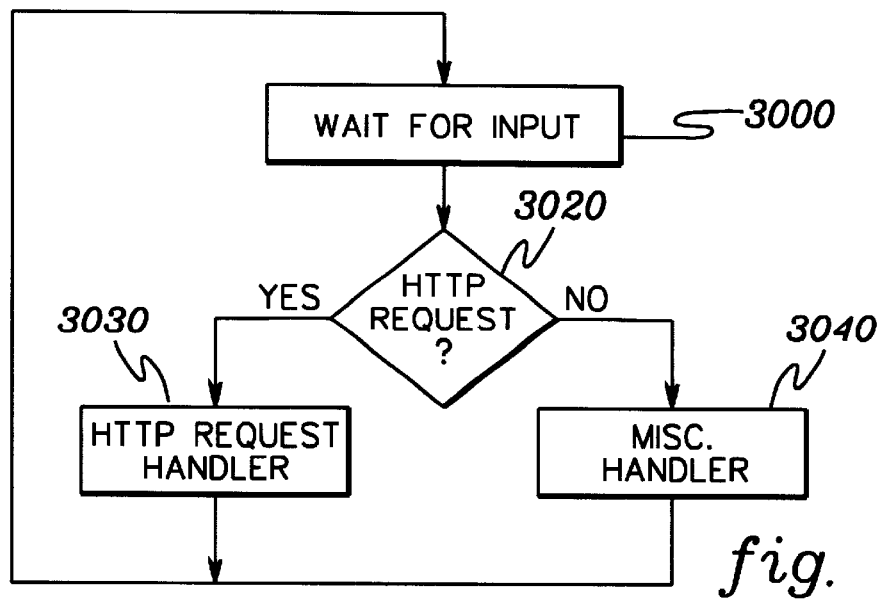
FIG. 4 depicts an example of logic for the server of FIG. 3, in accordance with the principles of the present invention.

FIG. 4 depicts an example of server logic having features of the present invention. As depicted, in STEP 3000, the server waits for input. From STEP 3020, if the input is an HTTP request, then the HTTP request handler (2030) is invoked in STEP 3030. If the received request is for another service, which is not the focus of the present invention, then from STEP 3020, an appropriate miscellaneous handler is called, STEP 3040.

Figure 5:
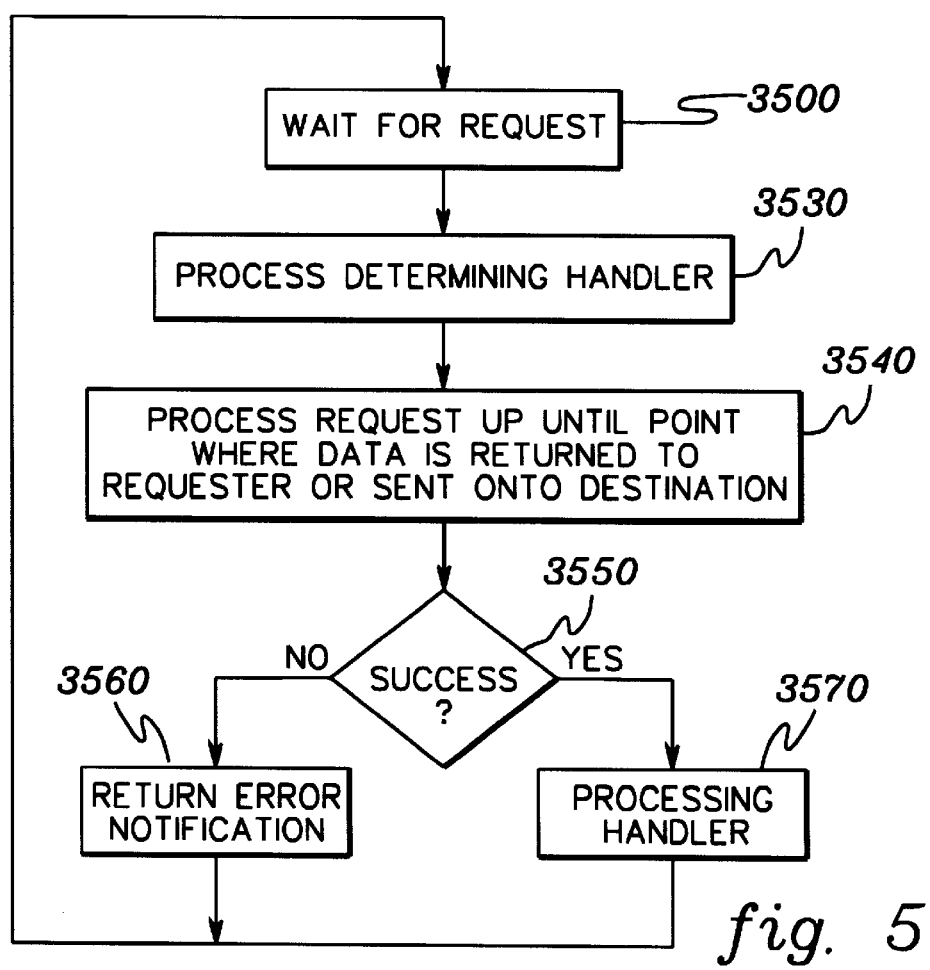
FIG. 5 depicts an example of an HTTP Request Handler, in accordance with the principles of the present invention.

FIG. 5 depicts an example of logic for an HTTP request handler (2030), which is a conventional HTTP web server (e.g., IBM's Internet Connection Server (ICS) which runs on IBM's RS/6000 workstation). The web server's behavior is extended with an API (e.g., ICAPI, which is included with IBM's Internet Connection Server product). This API allows web masters to configure their servers so that, at particular points during transaction processing, the server passes control to specified routines contained in specified modules; e.g., the Virus Checking Module (2040) in the case of a preferred implementation of this invention. Control is passed back to the server when each of these routines finishes. Note that this module contains both routines (specifically, the Process Determining Handler (2050), the Processing Handler (2060), the Target Determining Handler (2070), and the Process Execution Handler (2080)); and a data structure, namely the Process Job instance, PJ, (2090), which is accessible to all routines within the Virus Checking Module (2040).

As depicted in FIG. 5, in STEP 3500 the HTTP request handler waits for requests. In STEP 3530, the server passes control to the Process Determining Handler (2050), which determines the processing to be applied to the data returned or transmitted. In STEP 3540, the request is processed up until the point where either the requested data is returned to the requester (e.g., when the web page is returned in response to a GET request), or until the specified data is transferred to its destination (e.g., when file contents are transferred to a server using an FTP PUT). From STEP 3550, if the request has failed (e.g., the requested web page does not exist), then in STEP 3560, the server returns the appropriate error notification to the requester. Otherwise, in STEP 3570, the server passes control to the Processing Handler (2060).

Figure 6:
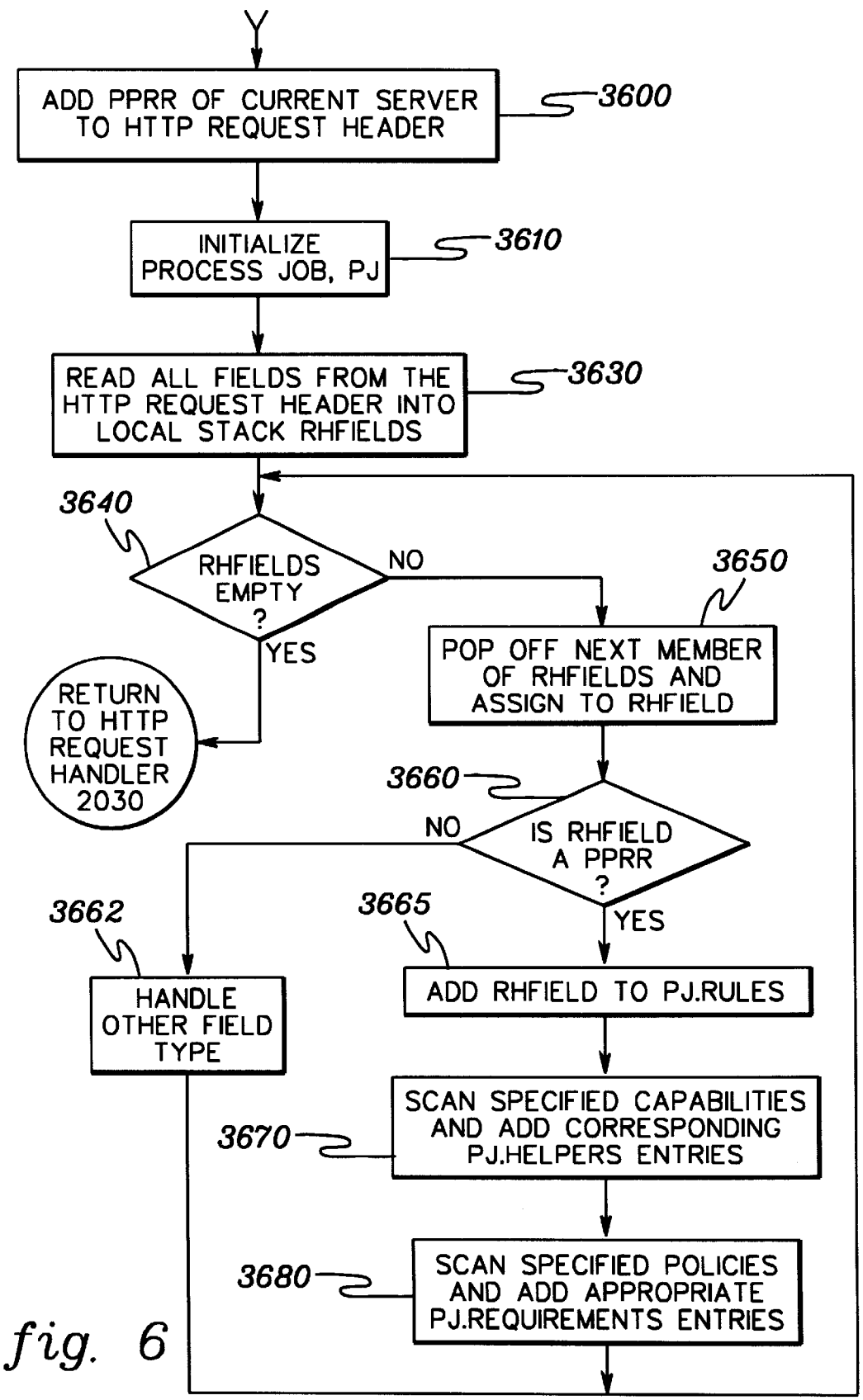
FIG. 6 depicts an example of a Process Determining Handler, in accordance with the principles of the present invention.

FIG. 6 depicts an example of a Process Determining Handler (2050) routine which determines the requested processing. In STEP 3600, the PPRR of the current server, if any, is added to the HTTP request header of the current HTTP request. In STEP 3610, PJ is initialized. That is, Data, Header, Targets, Requirements, Tasks, Helpers and Rules fields are all cleared; and the Processes field is read in from either memory (2000) or disk (2020), if it has not been set already. In STEP 3630, all fields from the current request's HTTP header are read into local stack variable, RHFields.

Control passes back to the HTTP Request Handler 2030 in STEP 3640, if RHFields has no entries. Otherwise, in STEP 3650, the next member of RHFields is popped off and assigned to local variable RHField. If RHField is not a PPRR, as identified by the "PICS Processing Request Rule" string in the value field of the author attribute, then in STEP 3662, whatever other type of information specified by the field is handled, if necessary. Those skilled in the art will appreciate that in STEP 3662, if the given field specifies whether the result of the current request is to be cached, the custom PJ.Cache field (discussed above) is set. Alternatively, if the field indicates that the data associated with the current request is multicast, then the PJ.Multicast field (discussed above) can be set. Following STEP 3662, program flow continues at STEP 3640.

If RHField is PPRR, then in STEP 3665, the entire PPRR is added as a member of PJ.Rules. Then, in STEP 3670, the capabilities entries in RHField, if any, are read in and added to PJ.Helpers. Finally, in STEP 3680, the policies of RHField are scanned and any policies that the current server can process (i.e., those where the processor and version are members of PJ.Processes) are added to PJ.Requirements. Program flow then continues at STEP 3640.

Figure 7:
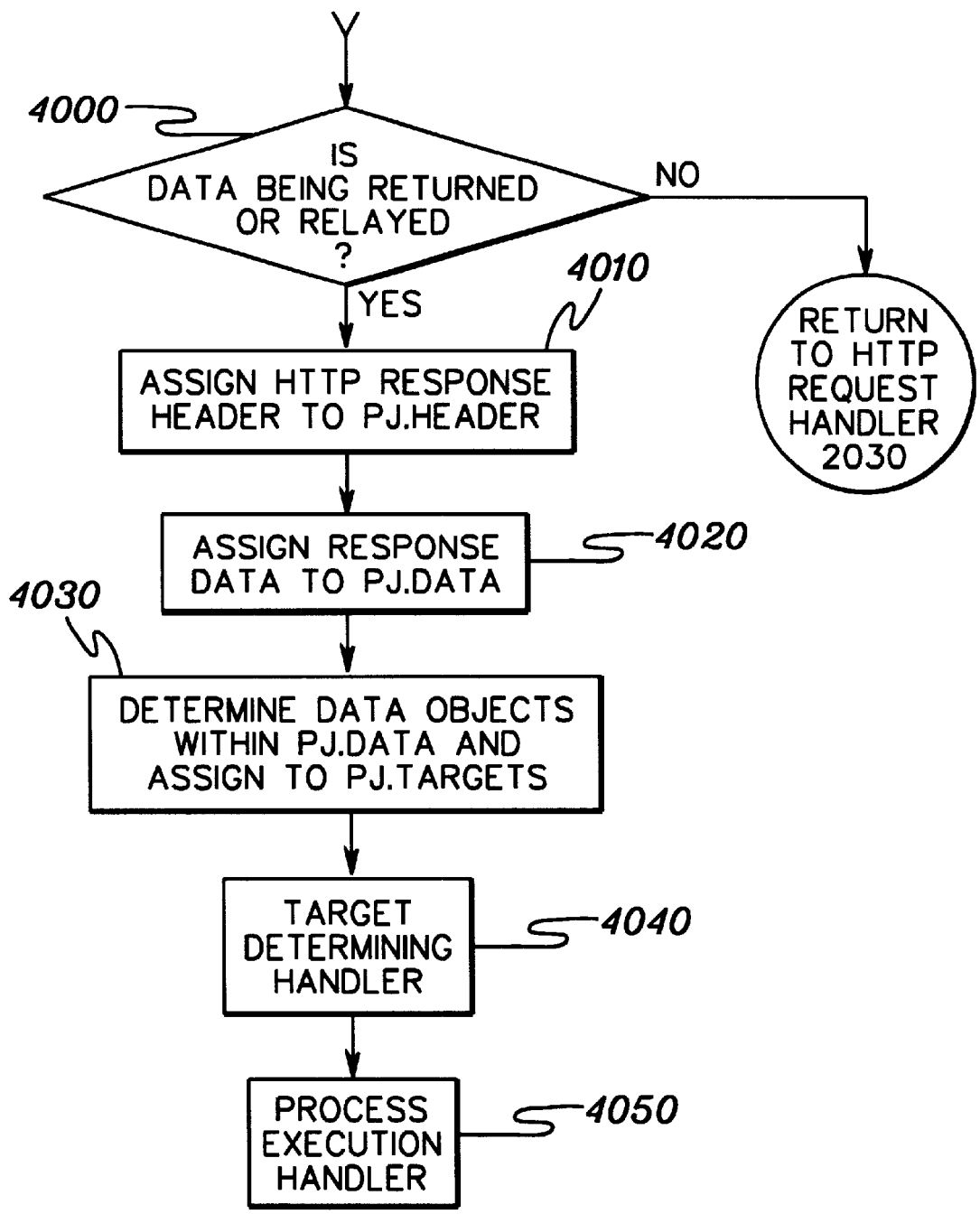
FIG. 7 depicts an example of a Processing Handler, in accordance with the principles of the present invention.

FIG. 7 depicts an example of the Processing Handler (2060). As depicted, if no data is being returned or relayed, then, since there is no data to process, control passes from STEP 4000 back to the HTTP request handler (2030). Otherwise, in STEP 4010, the HTTP response header is assigned to PJ.Header, and in STEP 4020, the data to be returned or transmitted is assigned to PJ.Data. Thereafter, in STEP 4030, all of the data objects within PJ.Data are identified and an entry for each is added to PJ.Targets. In addition to the pure data, each of these entries also contains a data type indicator (e.g., "executable"), a source indicator (e.g., www.ibm.com), and an indication of its location in PJ.Data (e.g., bits 423 through 6600). Those skilled in the art will appreciate that the data objects drawn from PJ.Data could include functions, software packages, and any other identifiable subset of PJ.Data. In STEP 4040, the Target Determining handler (2070) is called to determine what processing needs to be done by the current server. Finally, in STEP 4050, the Processing Execution Handler (2080) is called to carry out the necessary processing.

Figure 8:
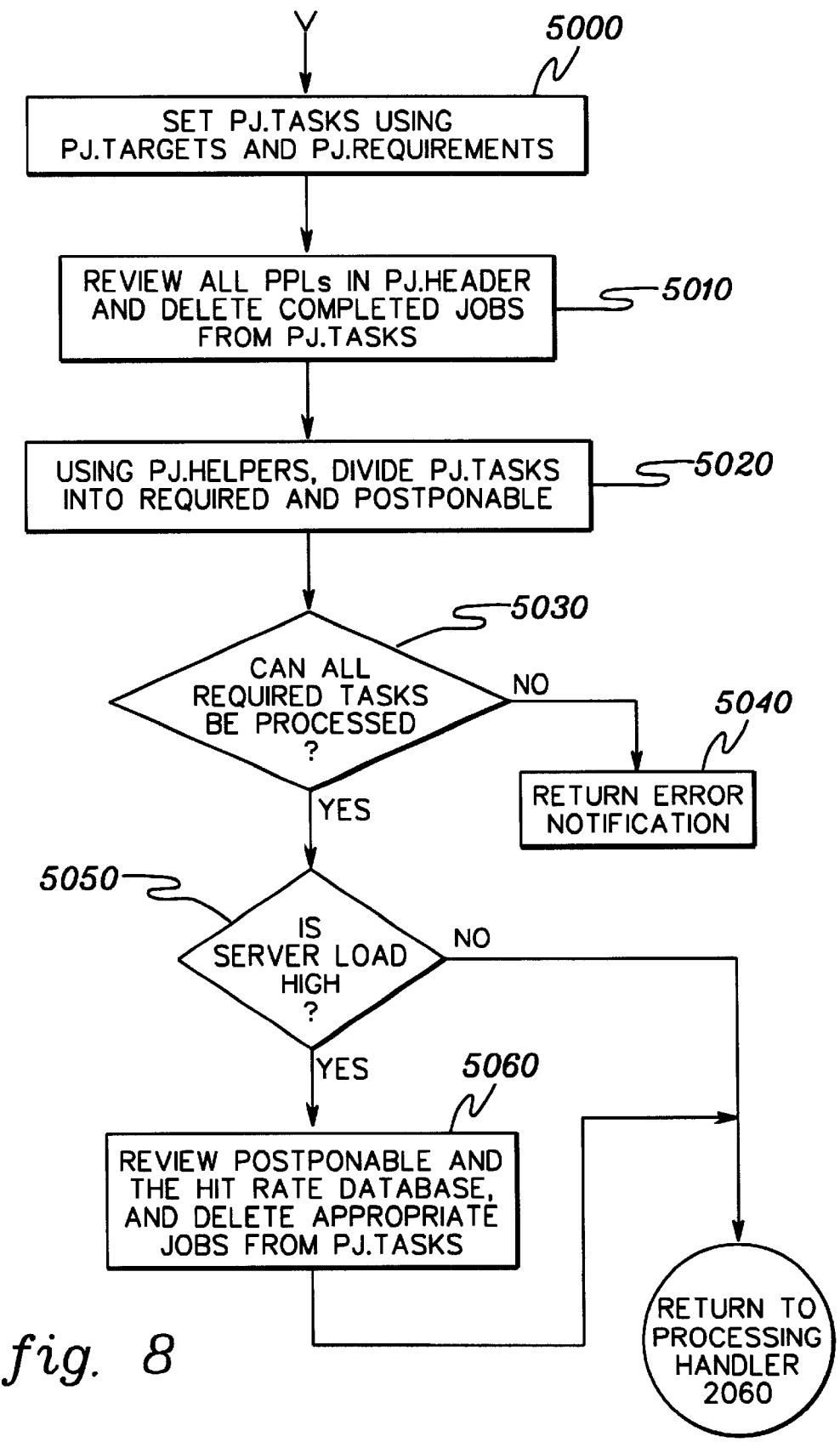
FIG. 8 depicts an example of a Target Determining Handler, in accordance with the principles of the present invention.

FIG. 8 depicts an example of the Target Determining Handler (2070). As depicted, in STEP 5000, PJ.Targets and PJ.Requirements are compared and all appropriate entries are added to PJ.Tasks. For example, suppose PJ.Targets only contains one entry, indicating that its data component is executable code (e.g., foo.exe). Suppose also that there are two entries in PJ.Requirements, one requiring all text files to be processed with Microsoft Anti-Virus, version 4.2 or later, and the other requiring all executable code to be processed with IBM AntiVirus, version 1.3, or later. Given this, an entry would be added to PJ.Tasks with a reference to the PJ.Targets entry and a reference to the IBM AntiVirus entry in PJ.Processes, indicating that the data component of the PJ.Targets entry should be processed with the current server's version of IBM AntiVirus.

Next, in STEP 5010, all PPLs within PJ.Header are reviewed, and all members of PJ.Tasks that have been completed are deleted. In STEP 5020, using all remaining entries in PJ.Tasks are divided into local temporary stack variables Required and Postponable, the members of Postponable being tasks that can be processed by downstream servers, as is determined using PJ.Helpers; and Required holds tasks the current server must process. If, in STEP 5030, a member of Required is found that cannot be processed due to user specified constraints, e.g., "processing must not cost more than $10," or "processing must be completed before Jan. 1, 2000," then, in STEP 5040, an error notification is returned to the requester, e.g., including indications of:

What policy failed; and

Who made the request.

Otherwise, if the load on the current server is low, program control is returned to the Processing Handler (2060). If the load on current server is significant, then, in STEP 5060, all members of Postponable are reviewed and where appropriate the corresponding member of PJ.Tasks is deleted. Note that in determining whether or not to delete a task from PJ.Tasks, the Request Rate Database (2096) is consulted. If the given task is frequently requested, then the current server will benefit from processing it and caching the results (if allowed), since it will be able to fulfill future equivalent responses more quickly and easily.

Those skilled in the art will appreciate that additional fields of PJ, the instance of Process Job, e.g., PJ.Cache and PJ.Multicast, could also be considered in determining whether or not to perform a given task. Suppose, for example, that one member of Postponable specifies that broken.exe must be virus checked with IBM AntiVirus, version 1.3, or later; and suppose that the Request Rate Database (2096) indicates that this request has never been made before. Since a downstream server can handle this task, and since interest in its processing is low, it is reasonable for it to be deleted from PJ.Tasks. When all members of Postponable have been reviewed, program control is returned to the Processing Handler (2060).

Figure 9:
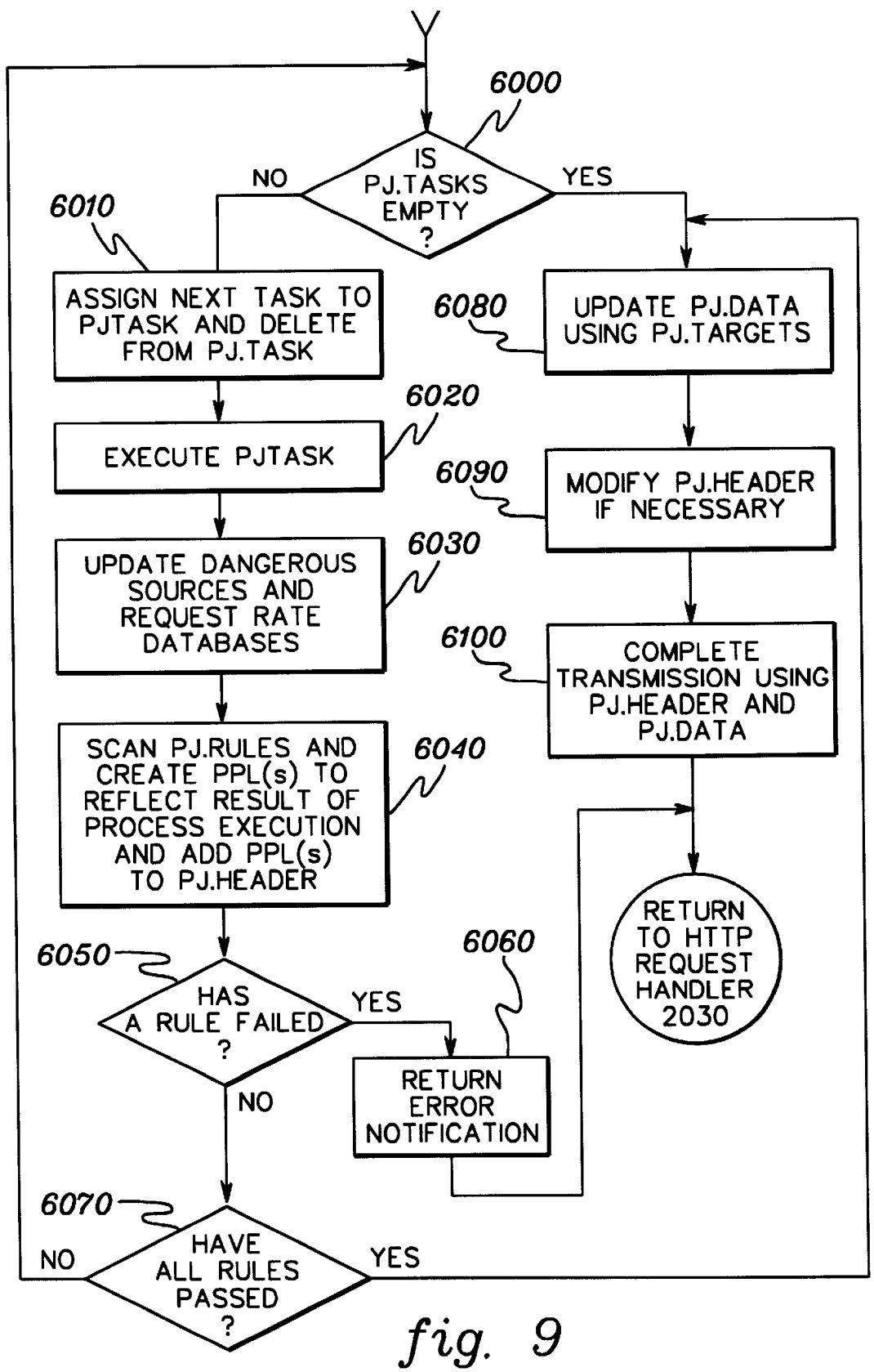
FIG. 9 depicts an example of a Processing Execution Handler, in accordance with the principles of the present invention.

FIG. 9 depicts an example of the Process Execution Handler (2080). If, in STEP 6000, PJ.Tasks is not empty, then in STEP 6010 the next task is assigned to local variable PJTask and deleted from PJ.Tasks. The server executes PJ.Task in STEP 6020, possibly altering the data upon which the process is applied (e.g., IBM AntiVirus can eliminate certain sorts of software viruses directly from code). Those skilled in the art will appreciate that if a server has a cached version of a given object to which the requested process had already been applied, and if the server verifies that the data object had not changed since the object was cached (using HEAD, for example), then it could use the cached version rather than having to perform any processing.

In STEP 6030, the Dangerous Source Database (2097) is updated with the results of the processing. For example, given the source of the data retrieved from its PJ.Targets' entry, the entry in the Dangerous Source Database (2097) for this site is updated given the execution results. Next, in STEP 6040, PJ.Rules is scanned for all of the policy entries that request the current task and a PPL is created for each using the appropriate PICS rating system or systems to reflect the result. Suppose, for example, that two different PPRRs each have a policy requiring all executable code be checked using IBM AntiVirus, one using rating system RatSys1 to indicate this, the other using RatSys2. Two PPLs would then be generated, one expressing the execution results in RatSys1 and the other using RatSys2. All generated PPL's are then added to PJ.Header. Note that in addition to specifying the result, PPL's also specify the source of the data and the reliability of the data's source.

In STEP 6050, if the results of the process execution cause one of the policies to reject the request, then, in STEP 6060, an error notification is returned to the requester, e.g., including indications of:

What policy failed; and

Who made the request.

Otherwise, in STEP 6070, all of the PPLs in PJ.Header (including the one or more PPLs representing the latest result) are compared to the PPRRs in PJ.Rules, to determine whether all of the PPRRs have been fulfilled. If so, program flow continues at STEP 6080; otherwise program flow continues with STEP 6000.

In STEP 6080, PJ.Data is updated using the data and object locations from PJ.Targets. In STEP 6090, the PJ.Header is modified, if necessary, to reflect the new, processed data (e.g., the value of the "length" field may have changed due to modifications made to the data objects by one or more of the processes, such as IBM AntiVirus). Finally, in STEP 6100, the HTTP transaction is completed with PJ.Header being sent as the HTTP response header and PJ.Data sent as the body. Following this transmission, control is returned to the HTTP Request Handler (2030).

Since, in addition to HTTP, ESMTP (a common extended version of SMTP), FTP and Gopher use RFC-822 headers (for details see: http://www.pmg.lcs.mit.edu/cgi-bin/rfc/view?number=822) and, since PICS labels and PICSRules rules can be included in RFC-822 headers, the above invention can be incorporated into servers that proxy FTP and Gopher (e.g., the Internet Connection Server sold by IBM) and mail relays (e.g., servers running the sendmail system included in the AIX 4.1.5 product sold by IBM). Further, since the technical bodies which define other common application protocols, such as NNTP, are now also considering adding PICS support to their protocols, the current invention will be able to be applied to machines providing these services (e.g., NNTP service provided by the above-referenced, publicly available INN 1.5.1 program). All of these services run on the RS/6000 workstation product sold by IBM. Those with usual skill in the art will also appreciate that multiple proxy servers can run concurrently on a single hardware platform, for example, a single computer.

Figure 10:
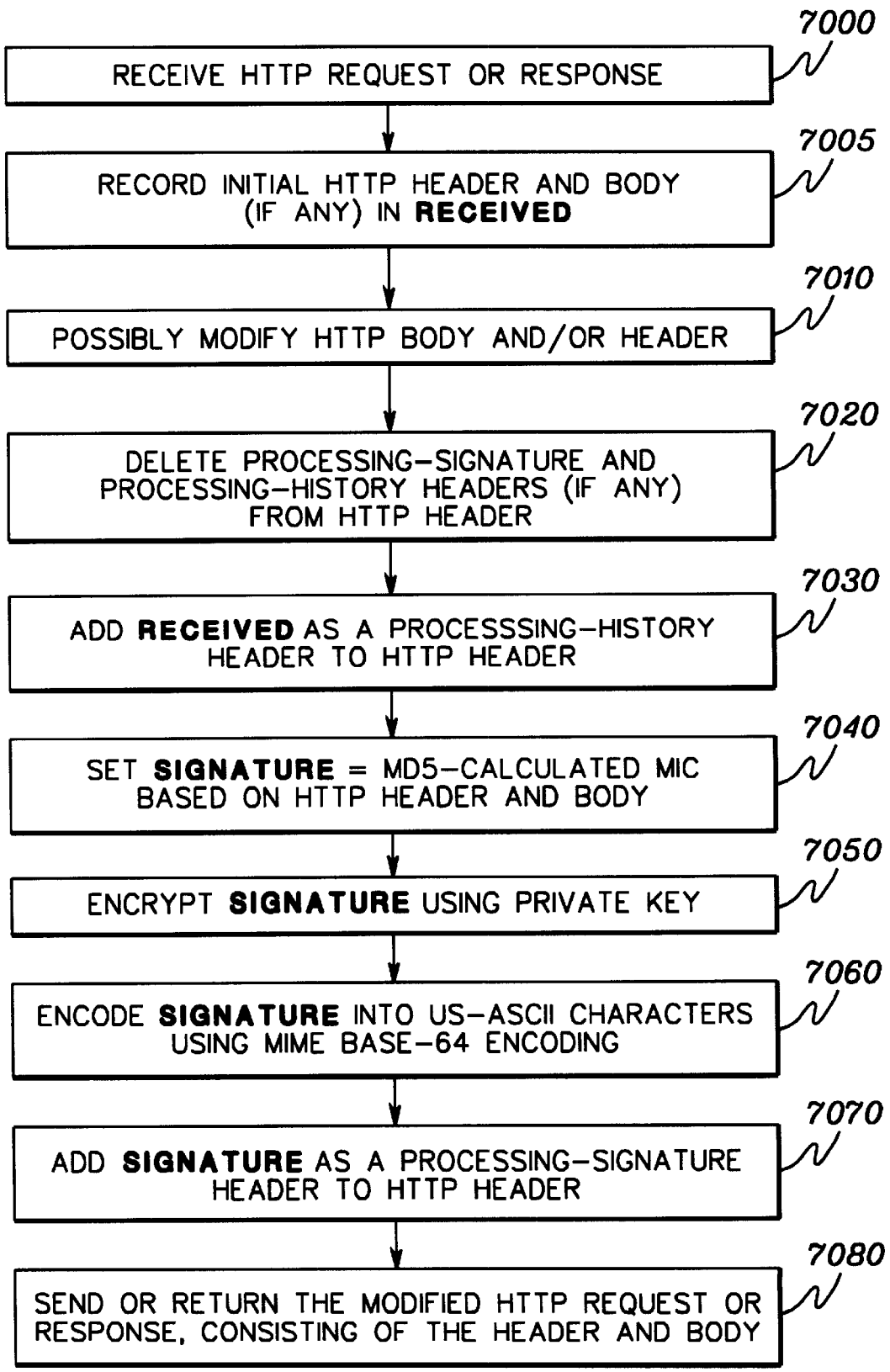
FIG. 10 depicts an example of a digital signing routine, in accordance with the principles of the present invention.

The current invention also includes a method to digitally sign the requests and responses sent to and from servers and clients in a hierarchy of servers. An example of this method is depicted in FIG. 10. By means of these signatures, all responses and requests can be verified. Those with usual skill in the art will appreciate that such verification is necessary in situations where processing is provided for a fee.

As depicted in FIG. 10, in STEP 7000 an HTTP request or response is received. In STEP 7005, the entire request or response, i.e., both header and body, are stored in a variable Received, which is global to the Virus Checking Module (2040). In the preferred embodiment above, STEPS 7000 and 7005 would be triggered before STEP 3600 in FIG. 6, in the case of a request, and before STEP 4010 in FIG. 7, in the case of a response. In STEP 7010 of FIG. 10, either the HTTP header or body, or both, is possibly modified. In a preferred embodiment, STEP 7010 corresponds to the possible modifications made in STEP 3600 (FIG. 6) in the case of a request, and in STEPS 6020, 6040, 6080 and 6090 (FIG. 9), in the case of a response. In STEP 7020, any Processing-History and Processing-Signature headers are deleted from the HTTP header. In STEP 7030, Received is added as a Processing History header to the HTTP header, i.e., a line in the HTTP header consisting of;

Processing-History: <Received> where <Received> is the value of the Received variable. In STEP 7040, a local variable Signature is set equal to a MD5-computed message integrity check (MIC), i.e., a checksum or hash, computed using the MD5 algorithm (see RFC 1321, URL: http://www.pmg.lcs.mit.edu/cgi-bin/rfc/view?number=1321 for details) applied to the new modified HTTP header and body. This calculation can be performed using the RSAREF code supplied by RSA Laboratories, Redwood City, Calif. 94065-1031. In STEP 7050, Signature is encrypted using the current server's private key. Software to create the required public/private key pairs and to provide the required encryption and decryption can also be performed using the RSAREF software. Note that with private/public key encryption techniques, all hosts wishing to digitally sign their requests and/or responses will have to be issued a private key known only to themselves. Further, hosts wishing to validate signatures provided by these hosts will have to obtain the corresponding public keys. In STEP 7060, Signature is encoded into US-ASCH characters using MIME base-64 encoding (see the above-referenced RFC 1521 for details). This encoding can also be accomplished using the RSAREF code. In STEP 7070, Signature (split into 60 character lines) is added as a Processing-Signature header to the HTTP header, i.e., a carriage return, line feed terminated line in the HTTP header consisting of:

Processing-Signature: <Signature> where <Signature> is the value of the Signature variable. In STEP 7080, the HTTP transaction is completed with the new modified HTTP header and body being sent or returned.

An example is next presented of how an object and its associated meta-information could be modified in accordance with this invention if returned to client 1210 (FIG. 1) from content server 1000 via processing proxy servers 1110 and 1130, respectively. Note that in the example below, <Header 1> and <Header 2> do not contain Processing-History and Processing-Signature headers. Also note that the numbers on the left are only line number indicators and not part of the transmitted data.

1. <Header 0>
2. <Data 0> is received by proxy 1100 from content server 1000.

3. Processing-Signature: <Signature 1>
4. Processing-History: "<Header 0>
5. <Data 0>"
6. <Header 1>
7. <Data 1> is received by proxy server 1130, where <Signature 1> is the digital signature based on lines 4 through 7, <Header 1> is <Header 0> modified by proxy 1100, and <Data 1> is <Data 0> modified by proxy 1100 through its processing.

8. Processing-Signature: <Signature 2>
9. Processing-History:
    "Processing-Signature: <Signature 1>
10. Processing-History: "<Header 0>
11. <Data 0>"
12. <Header 1>
13. <Data 1>"
14. <Header 2>
15. <Data 2> is received by client 1210, where <Signature 2> is the digital signature based on lines 9 through 15, <Header 2> is <Header 1> modified by proxy 1130, and <Data 2> is <Data 1> modified by proxy 1130 through its processing.

As those skilled in the art will appreciate, to provide additional security rather than creating the MIC using the MD5 algorithm, the SHA algorithm can be used (a detailed explanation of which can be found in Bruce Schneier, *Applied Cryptography, Protocols, Algorithms and Source Code* in C. John Wiley and Sons, Inc., New York, N.Y., 1996, ISBN 0-471-11709-9) which creates a larger and, hence, less reproducible MIC.

Those skilled in the art will also appreciate that in order to reduce the overall amount of data in each HTTP transaction, rather than recording the entire HTTP body in the Processing-History header, servers could instead store only the changes that need to be applied to current data to reconstitute the original data. This is incremental storage turned backwards: rather than remembering the original data and maintaining specifications of how it is changed by each subsequent processing server, here servers simply change the original data and maintain specification of how to recalculate the previous version. Any version of the HTTP body could be recalculated modifying the current HTTP body with the incremental-change specifications drawn from the Processing-History headers, accessed recursively, until the desired server's contribution is reached. This form of reverse-incremental storage is advantageous for this application, since the latest version of the HTTP body is also immediately accessible (i.e., the incremental-change specifications do not need to be applied sequentially to the original data).

Figure 11:
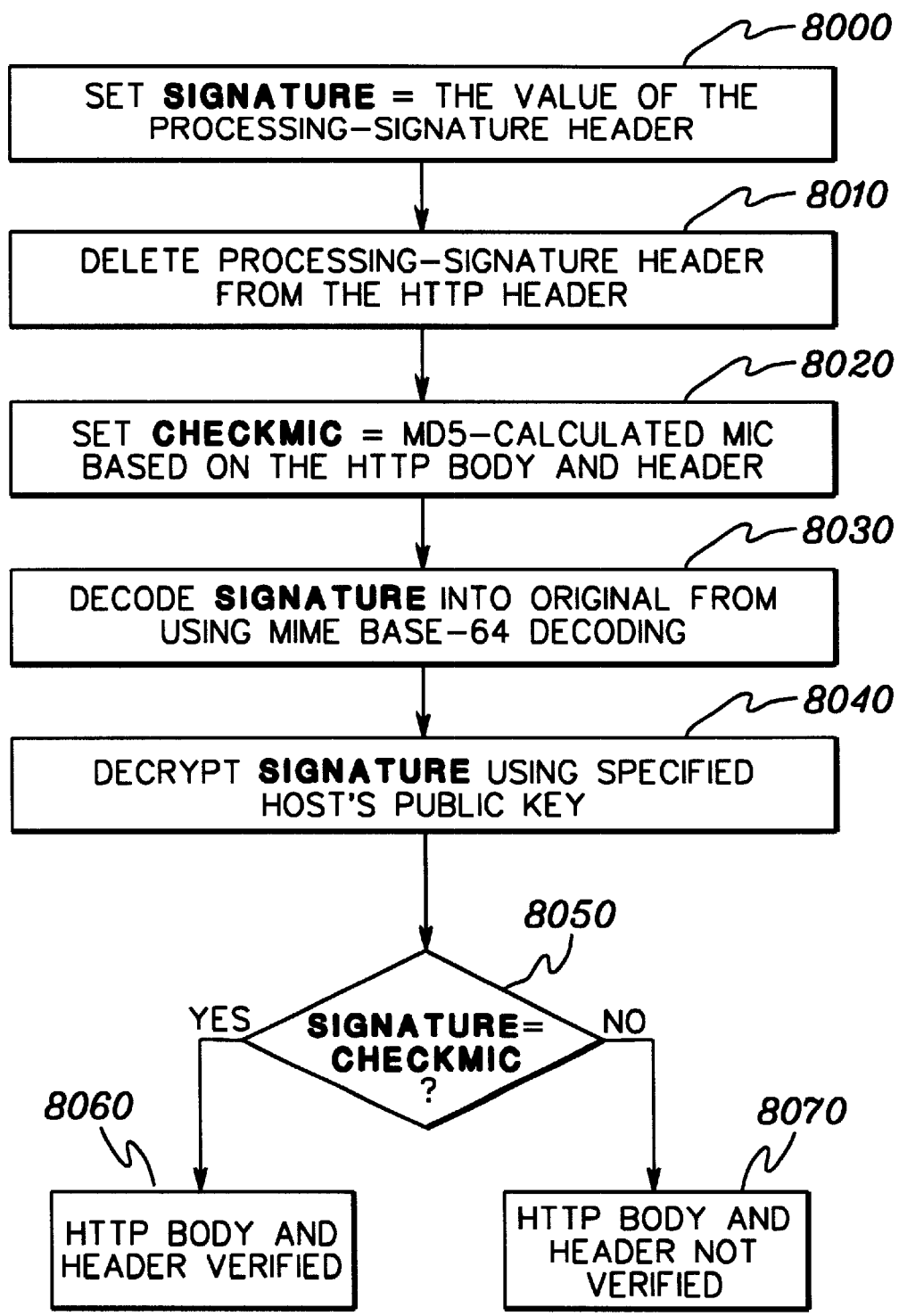
FIG. 11 depicts an example of a digital verification routine, in accordance with the principles of the present invention.

FIG. 11 depicts an example of how clients and intermediate servers can validate the processed HTTP requests and responses they receive. First, in STEP 8000, a local variable Signature, is set equal to the value of the Processing-Signature header from the received information's HTTP header, and then the Processing-Signature header is deleted in STEP 8010. In STEP 8020, another local variable CheckMIC, is set equal to the MD5-calculated MIC based on the HTTP body and modified header (specifically, the header is now lacking its initial Processing-Signature header). In STEP 8030, Signature is decoded from US-ASCII back into its original form using MIME base-64 decoding. Signature is then decoded using the specified host's public key, in STEP 8040, and then compared to CheckMIC in STEP 8050. If they are equivalent (STEP 8060) then the validation of the HTTP body and header, succeeds; otherwise, it fails (STEP 8070).

Previous processing steps can be checked in much the same way except that rather than using the request or response received, the client or intermediate server uses a value stored in the Processing-History header. Since all processing steps have been recorded recursively, all processing steps can be checked.

The present invention can be included in an article of manufacture (e.g., one or more computer program products) having, for instance, computer useable media. The media has embodied therein, for instance, computer readable program code means for providing and facilitating the capabilities of the present invention. The article of manufacture can be included as a part of a computer system or sold separately.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Thus, while we have described our preferred embodiment of our invention, it will be understood that those skilled in the art, both now and in the future, may make various improvements and enhancements, which fall within the scope of the claims which follow. These claims should be construed to maintain the proper protection for the invention first disclosed.

What is claimed is:

1. In a network of servers coupling a server of objects to a client through at least one intermediary server, a method for processing an object to be sent from the server, said method comprising:
   (a) allowing at least one of said client and said at least one intermediary server to initially specify meta information to be associated with said object;
   (b) processing said object's content at an intermediary server of said at least one intermediary server of said network of servers, said processing of object content being pursuant to said meta information associated with said object; and
   (c) modifying said meta information associated with said object to reflect said processing (b) of said object by said intermediary server.

2. The method of claim 1, wherein said meta information includes a request for processing, and wherein said processing (b) comprises processing said object content pursuant to said request for processing of said meta information associated with said object.

3. The method of claim 2, wherein said request for processing is communicated using platform for internet content selection (PICS) protocol.

4. The method of claim 1, wherein said intermediary server comprises a first intermediary server of said network of servers and said method further comprises communicating processed object content resulting from said processing (b) and modified meta information resulting from said modifying (c) to a second intermediary server in said network of servers.

5. The method of claim 1, wherein said processing (b) comprises modifying said object content at said intermediary server pursuant to said meta information associated with said object.

6. The method of claim 1, wherein said processing (b) further comprises producing a feedback communication from said processing of said object's content, and wherein said method further comprises providing said feedback communication to at least one of another intermediary server or a client of said network of servers.

7. The method of claim 1, wherein said object comprises executable code.

8. The method of claim 1, wherein said object comprises a compound object, said compound object having multiple objects, each object of said compound object having meta information associated therewith, and wherein said processing (b) comprises processing content of at least one object of said compound object using said at least one object's associated meta information, and wherein said modifying (c) comprises modifying said meta information associated with said at least one object of said compound object to reflect said processing (b) of said at least one object by said intermediary server.

9. The method of claim 1, wherein said modifying (c) comprises modifying at said intermediary server said meta information associated with said object to reflect said processing (b) of said object at said intermediary server.

10. In a network of servers, a method for processing an object having meta information associated therewith, said method comprising:

(a) processing said object's content at a server of said network of servers, said processing of object content being pursuant to said meta information associated with said object;

(b) modifying said meta information associated with said object to reflect said processing (a) of said object; and (c) further comprising deciding at said server whether to perform said processing (a) of said object content, said deciding comprising considering at least one of current processing load of said server, or a number of prior requests for said object.

11. In a network of servers, a method for processing an object having meta information associated therewith, said method comprising:

(a) processing said object's content at a server of said network of servers, said processing of object content being pursuant to said meta information associated with said object; and (b) modifying said meta information associated with said object to reflect said processing (a) of said object; and (c) further comprising determining at said server whether to perform said processing (a), said determining comprising considering at least one of whether: said object is for multicasting; said object is to be cached at said server; said processing (a) can be performed for a user-specified price; or said processing (a) can be performed within a user-specified time constraint.

12. In a network of servers coupling a sender of objects to a client through at least one intermediary server, a method for processing an object sent from the sender, said method comprising:

(a) allowing at least one of said client and said at least one intermediary server to initially specify meta information to be associated with said object, (b) at least partially processing said object's content at a first intermediary server of said network of servers, said at least partial processing of object content being pursuant to said meta information associated with said object; and (c) modifying said meta information associated with said object to reflect said at least partial processing (b) (a) of said object.

13. The method of claim 12, further comprising communicating said at least partially processed object and said modified meta information from said first intermediary server to a second intermediary server of said network of servers, and at least partially processing said object's content at said second intermediary server of said network of servers, said at least partial processing of said object content being pursuant to said modified meta information associated with said object, and said method further comprises modifying said meta information associated with said object at said second intermediary server to reflect said at least partial processing of said object occurring at said second intermediary server.

14. The method of claim 12, wherein said method further comprises proceeding with said at least partial processing (b) pursuant to a request for processing within said associated meta information.

15. The method of claim 14, wherein said request for processing comprises a request for virus checking said object content.

16. The method of claim 12, wherein said method further comprises continuing processing of said object content at a second intermediary server of said network of servers and wherein said continuing processing of said object content at said second intermediary server is pursuant to a request for processing contained within said meta information associated with said object.

17. The method of claim 12, further comprising using platform for internet content selection (PICS) protocol to communicate said meta information from said first intermediary server to a second intermediary server of said network of servers.

18. The method of claim 12, wherein said at least partial processing (b) is pursuant to a request for processing contained within said associated meta information, and wherein said at least partial processing proceeds based on object type.

19. The method of claim 12, further comprising proceeding with said at least partial processing (b) at said first intermediary server based upon said first intermediary server's capabilities, said capabilities comprising steps, functions, coverage, software packages or versions/releases resident on said first intermediary server.

20. The method of claim 12, wherein said object comprises a compound object, said compound object having multiple objects, each object of said compound object having meta information associated therewith, and wherein said at least partial processing (b) comprises processing content of at least one object of said compound object using said at least one object's associated meta information, and wherein said modifying (c) comprises modifying said meta information associated with said at least one object of said compound object to reflect said partial processing (b) of said at least one object of said compound object.

21. The method of claim 12, wherein said allowing (a) comprises specifying a request for processing, said request for processing comprising at least one of an acceptable return/delivery time, or an acceptable cost for return/delivery of said object.

22. In a network of servers, a method for processing an object having meta information associated therewith, said method comprising:

(a) partially processing said obiect's content at a first server of said network of servers, said partial processing of object content being pursuant to said meta information associated with said object;

(b) modifying said meta information associated with said object to reflect said partial processing (a) of said object; and (c) further comprising deciding at said first server whether to perform said at least partial processing (a) of said object content, said deciding comprising considering at least one of current processing load of said first server, or a number of prior requests for said object.

23. In a network of servers, a method for processing an object having meta information associated therewith, said method comprising the steps of:

(a) partially processing said object's content at a first server of said network of servers, said partial processing of object content being pursuant to said meta information associated with said object;

(b) modifying said meta information associated with said object to reflect said partial processing (a) of said object; and (c) further comprising determining at said first server whether to perform said partial processing (a), said determining comprising considering at least one of whether: said object is for multicasting; said object is to be cached at said first server; said partial processing (a) can be performed for a user-specified price; or said partial processing (a) can be performed within a user-specified time constraint.

24. The method of claim 12, wherein said first intermediary server comprises one of a proxy server, a mail relay server, or a news server.

25. The method of claim 12, wherein said at least partial processing (b) comprises virus checking said object content, and wherein said method further comprises maintaining at said first intermediary server based on said virus checking at least one of reliability statistics or reliability classification for a content server providing said object content.

26. In a network of servers, a method for processing an object having meta information associated therewith, said method comprising:
   (a) partially processing said object's content at a first server of said network of servers, said partial processing of object content being pursuant to said meta information associated with said object;
   (b) modifying said meta information associated with said object to reflect said partial processing (a) of said object;
   wherein said at least partial processing (a) comprises virus checking said object content, and wherein said method further comprises maintaining at said first intermediary server based on said virus checking at least one of reliability statistics or reliability classification for a content server providing said object content; and
   further comprising applying said virus checking at said first server based on maintained reliability statistics or reliability classification of the content server providing said object content.

27. The method of claim 26, further comprising communicating reliability statistics or reliability classification data from said first server to a second server of said network of servers.

28. The method of claim 12, wherein said at least partial processing (b) further comprises producing a feedback communication from said at least partial processing of said object's content, and wherein said method further comprises providing said feedback communication to at least one of another server or a client of said network of servers, said feedback communication comprising information on at least one of checking performed by said first intermediary server or reliability statistics on a content server providing said object content.

29. The method of claim 28, further comprising communicating said feedback communication from said first intermediary server to a second intermediary server of said network of servers using platform for internet content selection (PICS) protocol.

30. The method of claim 12, wherein said at least partial processing (b) is pursuant to a request for processing contained within said meta information associated with said object, and wherein said method further comprises completing processing of said request for processing at multiple servers of said network of servers, said multiple servers comprising less than all servers of said network of servers.

31. The method of claim 30, wherein said multiple servers are within a communication path defined between a client and a content server of said network of servers, said content server providing said object content.

32. The method of claim 12, further comprising caching partially processed object content at said first intermediary server and returning a cached copy of said partially processed object content in response to future requests if actual object content has remained unchanged.

33. At least one program storage device readable by a machine, tangibly embodying at least one program of instructions executable by the machine to perform a method for processing an object having meta information associated therewith within a network of servers, said network of servers coupling a sender of objects to a client through at least one intermediary server, said method comprising:
   (a) allowing at least one of said client and said at least one intermediary server to initially specify meta information associated with said object;
   (b) processing said object's content at an intermediary server of said network of servers, said processing of object content being pursuant to said meta information associated with said object; and
   (c) modifying said meta information associated with said object to reflect said processing (b) of said object by said intermediary server.

34. The at least one program storage device of claim 33, wherein said meta information includes a request for processing, and wherein said processing (b) (a) comprises processing said object content pursuant to said request for processing of said meta information associated with said object.

35. The at least one program storage device of claim 33, wherein said intermediary server comprises a first intermediary server of said network of servers and said method further comprises communicating processed object content resulting from said processing (b) and modified meta information resulting from said modifying (c) to a second intermediary server in said network of servers.

36. The at least one program storage device of claim 33, wherein said processing (b) comprises modifying said object content at said intermediary server pursuant to said meta information associated with said object.

37. The at least one program storage device of claim 33, wherein said processing (b) further comprises producing a feedback communication from said processing of said object's content, and wherein said method further comprises providing said feedback communication to at least one of another intermediary server or a client of said network of servers.

38. The at least one program storage device of claim 33, wherein said object comprises executable code.

39. The at least one program storage device of claim 33, wherein said object comprises a compound object, said compound object having multiple objects, each object of said compound object having meta information associated therewith, and wherein said processing (b) comprises processing content of at least one object of said compound object using said at least one object's associated meta information, and wherein said modifying (c) comprises modifying said meta information associated with said at least one object of said compound object to reflect said processing (b) of said at least one object by said intermediary server.

40. At least one program storage device readable by a machine, tangibly embodying at least one program of instructions executable by the machine to perform a method for processing an object having meta information associated therewith within a network of servers, said method comprising:
   (a) processing said object's content at a server of said network of servers, said processing of object content being pursuant to said meta information associated with said object;
   (b) modifying said meta information associated with said object to reflect said processing (a) of said object; and
   (c) wherein said method further comprises deciding at said server whether to perform said intermediary processing (a) of said object content, said deciding comprising considering at least one of current processing load of said intermediary server, or a number of prior requests for said object.

41. At least one program storage device readable by a machine, tangibly embodying at least one program of instructions executable by the machine to perform a method for processing an object having meta information associated therewith within a network of servers, said method comprising:

(a) processing said obiect's content at a server of said network of servers, said processing of object content being pursuant to said meta information associated with said object;

(b) modifying said meta information associated with said object to reflect said processing (a) of said object; and (c) wherein said method further comprises determining at said server whether to perform said processing (a), said determining comprising considering at least one of whether: said object is for multicasting; said object is to be cached at said server; said processing (a) can be performed for a user-specified price; or said processing (a) can be performed within a user-specified time constraint.

42. At least one program storage device readable by a machine, tangibly embodying at least one program of instructions executable by the machine to perform a method for processing an object having meta information associated therewith within a network of servers, said network of servers coupling a sender of objects to a client through at least one intermediary server, said method comprising:

(a) allowing at least one of said client and said at least one intermediary server to initially specify meta information associated with said object;

(b) at least partially processing said object's content at a first intermediary server of said network of servers, said at least partial processing of object content being pursuant to said meta information associated with said object; and (c) modifying said meta information associated with said object to reflect said at least partial processing (b) of said object.

43. The at least one program storage device of claim 42, wherein said method further comprises communicating said at least partially processed object and said modified meta information from said first intermediary server to a second intermediary server of said network of servers, and at least partially processing said object's content at said second intermediary server of said network of servers, said at least partial processing of said object content being pursuant to said modified meta information associated with said object, and said method further comprises modifying said meta information associated with said object at said second intermediary server to reflect said at least partial processing of said object occurring at said second intermediary server.

44. The at least one program storage device of claim 42, wherein said method further comprises proceeding with said at least partial processing (b) pursuant to a request for processing within said associated meta information.

45. The at least one program storage device of claim 44, wherein said request for processing comprises a request for virus checking said object content.

46. The at least one program storage device of claim 42, wherein said method further comprises continuing processing of said object content at a second intermediary server of said network of servers and wherein said continuing processing of said object content at said second intermediary server is pursuant to a request for processing contained within said meta information associated with said object.

47. The at least one program storage device of claim 42, wherein said method further comprises using platform for internet content selection (PICS) protocol to communicate said meta information from said first intermediary server to a second intermediary server of said network of servers.

48. The at least one program storage device of claim 42, wherein said at least partial processing (b) is pursuant to a request for processing contained within said associated meta information, and wherein said at least partial processing proceeds based on object type.

49. The at least one program storage device of claim 42, wherein said object comprises a compound object, said compound object having multiple objects, each object of said compound object having meta information associated therewith, and wherein said at least partial processing (b) comprises processing content of at least one object of said compound object using said at least one object's associated meta information, and wherein said modifying (c) comprises modifying said meta information associated with said at least one object of said compound object to reflect said partial processing (b) of said at least one object of said compound object.

50. The at least one program storage device of claim 42, wherein said allowing (a) comprises specifying a request for processing, said request for processing comprising at least one of an acceptable return/delivery time, or an acceptable cost for return/delivery of said object.

51. At least one program storage device readable by a machine, tangibly embodying at least one program of instructions executable by the machine to perform a method for processing an object having meta information associated therewith within a network of servers, said method comprising:

(a) partially processing said object's content at a first server of said network of servers, said partial processing of object content being pursuant to said meta information associated with said object;

(b) modifying said meta information associated with said object to reflect said partial processing (a) of said object; and (c) wherein said method further comprises deciding at said first intermediary server whether to perform said at least partial processing (a) of said object content, said deciding comprising considering at least one of current processing load of said first server, or a number of prior requests for said object.

52. At least one program storage device readable by a machine, tangibly embodying at least one program of instructions executable by the machine to perform a method for processing an object having meta information associated therewith within a network of servers, said method comprising:

(a) partially processing said object's content at a first server of said network of servers, said partial processing of object content being pursuant to said meta information associated with said object;

(b) modifying said meta information associated with said object to reflect said partial processing (a) of said object; and (c) wherein said method further comprises determining at said first server whether to perform said partial processing (a), said determining comprising considering at least one of whether: said object is for multicasting;

said object is to be cached at said first server; said partial processing (a) can be performed for a user-specified price; or said partial processing (a) can be performed within a user-specified time constraint.

53. The at least one program storage device of claim 42, wherein said at least partial processing (b) comprises virus checking said object content, and wherein said method further comprises maintaining at said first intermediary server based on said virus checking at least one of reliability statistics or reliability classification for a content server providing said object content.

54. At least one program storage device readable by a machine, tangibly embodying at least one program of instructions executable by the machine to perform a method for processing an object having meta information associated therewith within a network of servers, said method comprising:
 (a) partially processing said object's content at a first server of said network of servers, said partial processing of object content being pursuant to said meta information associated with said object;
 (b) modifying said meta information associated with said object to reflect said partial processing (a) of said object; and
 (c) wherein said method further comprises applying said virus checking at said first server based on maintained reliability statistics or reliability classification of the content server providing said object content.

55. The at least one program storage device of claim 54, wherein said method further comprises the step of communicating reliability statistics or reliability classification data from said first server to a second server of said network of servers.

56. The at least one program storage device of claim 42, wherein said at least partial processing (b) further comprises producing a feedback communication from said at least partial processing of said object's content, and wherein said method further comprises providing said feedback communication to at least one of another server or a client of said network of servers, said feedback communication comprising information on at least one of checking performed by said first intermediary server or reliability statistics on a content server providing said object content.

57. The at least one program storage device of claim 56, wherein said method further comprises communicating said feedback communication from said first intermediary server to a second intermediary server of said network of servers using platform for internet content selection (PICS) protocol.

58. The at least one program storage device of claim 42, wherein said partial processing (b) is pursuant to a request for processing contained within said meta information associated with said object, and wherein said method further comprises completing processing of said request for processing at multiple servers of said network of servers, said multiple servers comprising less than all servers of said network of servers.

59. The at least one program storage device of claim 58, wherein said multiple servers are within a communication path defined between a client and a content server of said network of servers, said content server providing said object content.

60. The at least one program storage device of claim 42, wherein said method further comprises caching partially processed object content at said first intermediary server and returning a cached copy of said partially processed object content in response to future requests if actual object content has remained unchanged.

61. An article of manufacture, comprising:
 a computer usable medium having a computer readable program code means embodied therein for causing processing of an object having meta information associated therewith, the computer readable program code means in said article of manufacture comprising:
  computer-readable program code means for causing a computer to affect allowing at least one of a client and at least one intermediary server of a network of servers to initially specify said meta information associated with said object;
  computer-readable program code means for causing a computer to affect processing said object's content at an intermediary server of said network of servers, said processing of object content being pursuant to said meta information associated with said object; and
  computer-readable program code means for causing a computer to affect modifying said meta information associated with said object to reflect said processing of said object by said intermediary server.

62. The article of claim 61, wherein said meta information includes a request for processing, and wherein said computer-readable program code means for causing a computer to affect processing comprises computer-readable program code means for causing a computer to affect processing said object content pursuant to said request for processing of said meta information associated with said object.

63. The article of claim 61, wherein said intermediary server comprises a first intermediary server of said network of servers and said article further comprises computer-readable program code means for causing a computer to affect communicating processed object content resulting from said processing and modified meta information resulting from said modifying to a second intermediary server in said network of servers.

64. The article of claim 61, wherein said computer-readable program code means for causing a computer to affect processing comprises computer-readable program code means for causing a computer to affect modifying said object content at said intermediary server pursuant to said meta information associated with said object.

65. The article of claim 61, wherein said computer-readable program code means for causing a computer to affect processing further comprises computer-readable program code means for causing a computer to affect producing a feedback communication from said processing of said object's content, and wherein said article further comprises computer-readable program code means for causing a computer to affect providing said feedback communication to at least one of another intermediary server or a client of said network of servers.

66. The article of claim 61, wherein said object comprises executable code.

67. The article of claim 61, wherein said object comprises a compound object, said compound object having multiple objects, each object of said compound object having meta information associated therewith, and wherein said computer-readable program code means for causing a computer to affect processing comprises computer-readable program code means for causing a computer to affect processing content of at least one object of said compound object using said at least one object's associated meta information, and wherein said computer-readable program code means for causing a computer to affect modifying comprises computer-readable program code means for causing a computer to affect modifying said meta information associated with said at least one object of said compound object to reflect said processing of said at least one object by said intermediary server.

68. An article of manufacture, comprising:
a computer usable medium having a computer readable program code means embodied therein for causing processing of an object having meta information associated therewith, the computer readable program code means in said article of manufacture comprising:
computer-readable program code means for causing a computer to affect processing said object's content at a server of said network of servers, said processing of object content being pursuant to said meta information associated with said object;
computer-readable program code means for causing a computer to affect modifying said meta information associated with said object to reflect said processing of said object; and
further comprising computer-readable program code means for causing a computer to affect deciding at said server whether to perform said processing of said object content, said computer-readable program code means for causing a computer to affect deciding comprising computer-readable program code means for causing a computer to affect considering at least one of current processing load of said intermediary server, or a number of prior requests for said object.

69. An article of manufacture, comprising:
a computer usable medium having a computer readable program code means embodied therein for causing processing of an object having meta information associated therewith, the computer readable program code means in said article of manufacture comprising:
computer-readable program code means for causing a computer to affect processing said object's content at a server of said network of servers, said processing of object content being pursuant to said meta information associated with said object;
computer-readable program code means for causing a computer to affect modifying said meta information associated with said object to reflect said processing of said object; and
further comprising computer-readable program code means for causing a computer to affect determining at said server whether to perform said processing, said computer-readable program code means for causing a computer to affect determining comprising computer-readable program code means for causing a computer to affect considering at least one of whether: said object is for multicasting; said object is to be cached at said server; said processing can be performed for a user-specified price; or said processing can be performed within a user-specified time constraint.

70. An article of manufacture, comprising:
a computer usable medium having a computer readable program code means embodied therein for causing within a network of servers, processing of an object having meta information associated therewith, the computer readable program code means in said article of manufacture comprising:
computer-readable program code means for causing a computer to affect allowing at least one of a client and at least one intermediary server of a network of servers to initially specify said meta information associated with said object;
computer-readable program code means for causing a computer to affect at least partially processing said object's content at a first intermediary server of said network of servers, said at least partial processing of object content being pursuant to said meta information associated with said object; and
computer-readable program code means for causing a computer to affect modifying said meta information associated with said object to reflect said at least partial processing of said object.

71. The article of claim 70, further comprising computer-readable program code means for causing a computer to affect communicating said at least partially processed object and said modified meta information from said first intermediary server to a second intermediary server of said network of servers, and at least partially processing said object's content at said second intermediary server of said network of servers, said at least partial processing of said object content being pursuant to said modified meta information associated with said object, and said article further comprises computer-readable program code means for causing a computer to affect modifying said meta information associated with said object at said second intermediary server to reflect said at least partial processing of said object occurring at said second intermediary server.

72. The article of claim 70, wherein said article further comprises computer-readable program code means for causing a computer to affect proceeding with said at least partial processing pursuant to a request for processing within said associated meta information.

73. The article of claim 72, wherein said request for processing comprises a request for virus checking said object content.

74. The article of claim 70, wherein said article further comprises computer-readable program code means for causing a computer to affect continuing processing of said object content at a second intermediary server of said network of servers and wherein said continuing processing of said object content at said second intermediary server is pursuant to a request for processing contained within said meta information associated with said object.

75. The article of claim 70, wherein said object comprises a compound object, said compound object having multiple objects, each object of said compound object having meta information associated therewith, and wherein said computer-readable program code means for causing a computer to affect at least partial processing comprises computer-readable program code means for causing a computer to affect processing content of at least one object of said compound object using said at least one object's associated meta information, and wherein said computer-readable program code means for causing a computer to affect modifying comprises computer-readable program code means for causing a computer to affect modifying said meta information associated with said at least one object of said compound object to reflect said at least partial processing of said at least one object of said compound object.

76. The article of claim 70, wherein said computer-readable program code means for causing a computer to affect allowing comprises specifying a request for processing, said request for processing comprising at least one of an acceptable return/delivery time, or an acceptable cost for return/delivery of said object.

77. An article of manufacture, comprising:
a computer usable medium having a computer readable program code means embodied therein for causing within a network of servers, processing of an object having meta information associated therewith, the computer readable program code means in said article of manufacture comprising:

computer-readable program code means for causing a computer to affect partially processing said object's content at a first server of said network of servers, said partial processing of object content being pursuant to said meta information associated with said object;

computer-readable program code means for causing a computer to affect modifying said meta information associated with said object to reflect said partial processing of said object; and further comprising computer-readable program code means for causing a computer to affect deciding at said first server whether to perform said at least partial processing of said object content, said computer-readable program code means for causing a computer to affect deciding comprising computer-readable program code means for causing a computer to affect considering at least one of current processing load of said first server, or a number of prior requests for said object.

78. An article of manufacture, comprising:

a computer usable medium having a computer readable program code means embodied therein for causing within a network of servers, processing of an object having meta information associated therewith, the computer readable program code means in said article of manufacture comprising:

computer-readable program code means for causing a computer to affect partially processing said object's content at a first server of said network of servers, said partial processing of object content being pursuant to said meta information associated with said object;

computer-readable program code means for causing a computer to affect modifying said meta information associated with said object to reflect said partial processing of said object; and further comprising computer-readable program code means for causing a computer to affect determining at said first server whether to perform said partial processing, said computer-readable program code means for causing a computer to affect determining comprising computer-readable program code means for causing a computer to affect considering at least one of whether: said object is for multicasting; said object is to be cached at said first server; said partial processing can be performed for a user-specified price; or said partial processing can be performed within a user-specified time constraint.

79. The article of claim 70, wherein said computer-readable program code means for causing a computer to affect at least partial processing comprises computer-readable program code means for causing a computer to affect virus checking said object content, and wherein said article further comprises computer-readable program code means for causing a computer to affect maintaining at said first intermediary server based on said virus checking at least one of reliability statistics or reliability classification for a content server providing said object content.

80. An article of manufacture, comprising:

a computer usable medium having a computer readable program code means embodied therein for causing within a network of servers, processing of an object having meta information associated therewith, the computer readable program code means in said article of manufacture comprising:

computer-readable program code means for causing a computer to affect partially processing said object's content at a first server of said network of servers, said partial processing of object content being pursuant to said meta information associated with said object;

computer-readable program code means for causing a computer to affect modifying said meta information associated with said object to reflect said partial processing of said object;

computer-readable program code means for causing a computer to affect partial processing comprises computer-readable program code means for causing a computer to affect virus checking said oblect content, and wherein said article further comprises computer-readable program code means for causing a computer to affect maintaining at said first server based on said virus checking at least one of reliability statistics or reliability classification for a content server providing said object content; and further comprising computer-readable program code means for causing a computer to affect applying said virus checking at said first server based on maintained reliability statistics or reliability classification of the content server providing said object content.

81. The article of claim 81, further comprising computer-readable program code means for causing a computer to affect communicating reliability statistics or reliability classification data from said first server to a second server of said network of servers.

82. The article of claim 70, wherein said computer-readable program code means for causing a computer to affect at least partial processing further comprises computer-readable program code means for causing a computer to affect producing a feedback communication from said at least partial processing of said object's content, and wherein said article further comprises computer-readable program code means for causing a computer to affect providing said feedback communication to at least one of another server or a client of said network of servers, said feedback communication comprising information on at least one of checking performed by said first intermediary server or reliability statistics on a content server providing said object content.

83. The article of claim 70, wherein said computer-readable program code means for causing a computer to affect at least partial processing is responsive to a request for processing contained within said meta information associated with said object, and wherein said article further comprises computer-readable program code means for causing a computer to affect completing processing of said request for processing at multiple servers of said network of servers, said multiple servers comprising less than all servers of said network of servers.

84. The article of claim 61, wherein said multiple servers are within a communication path defined between a client and a content server of said network of servers, said content server providing said object content.

85. The article of claim 70, further comprising computer-readable program code means for causing a computer to affect caching partially processed object content at said first intermediary server and returning a cached copy of said partially processed object content in response to future requests if actual object content has remained unchanged.

* * * * *

UNITED STATES PATENT AND TRADEMARK OFFICE
CERTIFICATE OF CORRECTION

PATENT NO. : 6,275,937 B1
DATED : August 14, 2001
INVENTOR(S) : Hailpern et al.

It is certified that error appears in the above-identified patent and that said Letters Patent is hereby corrected as shown below:

<u>Column 21,</u>
Line 42, delete "(a)"

<u>Column 24,</u>
Line 18, delete "(a)"

<u>Column 32,</u>
Line 27, delete "81" and insert -- 80 --
Line 55, delete "61" and insert -- 83 --

Signed and Sealed this

Ninth Day of July, 2002

Attest:

Attesting Officer

JAMES E. ROGAN
*Director of the United States Patent and Trademark Office*